(12) United States Patent  (10) Patent No.: US 7,660,029 B2
Ashrit et al.  (45) Date of Patent: Feb. 9, 2010

(54) CHROMOGENICALLY TUNABLE PHOTONIC CRYSTALS

(75) Inventors: Pandurang Ashrit, Moncton (CA); Sulan Kuai, Edmonton (CA)

(73) Assignee: Universite de Moncton, Moncton, NB (CA)

( * ) Notice: Subject to any disclaimer, the term of this patent is extended or adjusted under 35 U.S.C. 154(b) by 259 days.

(21) Appl. No.: 11/878,979

(22) Filed: Jul. 30, 2007

(65) Prior Publication Data

US 2008/0030837 A1  Feb. 7, 2008

Related U.S. Application Data

(60) Provisional application No. 60/834,490, filed on Aug. 1, 2006.

(51) Int. Cl.
*G02F 1/15* (2006.01)
*G02F 1/153* (2006.01)

(52) U.S. Cl. ............... 359/265; 359/270; 359/273; 359/274

(58) Field of Classification Search ......... 359/265–275; 429/213, 217; 252/582, 583; 345/84, 85, 345/105, 107
See application file for complete search history.

(56) References Cited

U.S. PATENT DOCUMENTS

| 5,277,986 | A | 1/1994 | Cronin et al. |
| 7,158,277 | B2 * | 1/2007 | Berggren et al. ............ 359/274 |
| 7,301,687 | B2 * | 11/2007 | Berggren et al. ............ 359/274 |
| 7,450,292 | B1 * | 11/2008 | Burrell et al. ............... 359/270 |

OTHER PUBLICATIONS

Xin Xiang Jiang et al., The Study of the Effects of Atomic Oxygen Erosion on the Microstructure and Property of VO2 Thermochromic Coating Using CSA's Space Simulation Apparatus, Protection of Materials and Structures from space Environment, 2006, pp. 341-350, Netherlands, Jan. 2006.

(Continued)

*Primary Examiner*—Mohammed Hasan
(74) *Attorney, Agent, or Firm*—Eugene F. Derényi; Stikeman Elliott LLP

(57) ABSTRACT

Tunable photonic crystals offer an interesting possibility to adjust the photonic band gap (PBG) as per requirement. Various methods of achieving this have been tried that include polarization of liquid crystals, thermal effects and more. Chromogenic devices provided in accordance with the present invention include combinations and subcombinations of electrochromic, photochromic, thermochromic devices featuring TMO based inverse opals having tunable photonic band gaps (PBG) for certain frequencies. Electrochromic (EC) materials in which a reversible optical property change can be induced with the application of a small electric field offer a novel possibility to tune the PBG in a controlled and reversible way. The reversible chemical change and the ensuing change of optical constants in these periodically arranged EC materials make the PBG tunability possible. In a recent work we have demonstrated for the first time the PBG tunability of EC materials deposited in the form of periodic inverse opals. This earlier work was carried out with the well known Tungsten Trioxide ($WO_3$) EC thin films into which lithium intercalation was done by a dry lithiation method. In the present work we report on the fabrication of a simple tunable photonic crystal device based on electrochemical insertion/extraction of lithium based on $WO_3$ inverse opals.

25 Claims, 20 Drawing Sheets

OTHER PUBLICATIONS

Christophe Petit et al., Hysteresis of the Metal-Insulator Transition of VO2; Evidence of the Influence of Microscopic Texturation, The Influence of Texturation on VO2 Optical Hysteresis, 1999, pp. 3259-3264, United Kingdom, Nov. 24, 1999.

P. Halevi, Tunable Photonic Crystals with Semiconducting Constituents, Physical Review Letters, Aug. 28, 2000, pp. 1875-1878, vol. 85, No. 9.

Songwei Lu et al., Structure and Optical Property Changes of Sol-Gel Derived VO2 Thin Films, Advanced Materials, 1997, pp. 244-246, Sep. 1997.

Gang Xu et al., Thickness Dependence of Optical Properties of VO2 Thin Films Epitaxially Grown on Sapphire, Applied Surface Science, 2004, pp. 449-452, Sep. 22, 2004.

Alex Figotin et al., Two-Dimensional Tunable Photonic Crystals, The American Physical Society, 1998, pp. 2841-2848, Feb. 1, 1998.

Dingke Zhang et al., Improvement of Amplified Spontaneous Emission by Encapsulating Green Fluorescent Dye in Inverted-Opal Titania Photonic Crystals, Applied Optics, Mar. 20, 2008, pp. 1177-1181, vol. 47, No. 9.

P.V. Ashrit, Dry Lithiation Study of Nanocrystalline, Polycrystalline and Amorphous Tungsten Trioxide Thin-Films, Thin Solid Films, Jun. 25, 2000, pp. 81-88.

G. Bader et al., Transmission and Reflection Ellipsometry Studies of Electrochromic Materials and Devices, SPIE, vol. 2531, pp. 70-81, Jun. 1990.

P.V. Ashrit et al., Electrochromic Properties of Nanocrystalline Tungsten Oxide Thin Films, Thin Solid Films, Jun. 23, 1997, pp. 324-328.

Sulan-Kuai, Georges Bader and P.V. Ashrit, Applied Physics Lett., 86, 221110 (2005).

* cited by examiner

CHROMOGENICALLY TUNABLE PHOTONIC CRYSTALS

CROSS-REFERENCE TO RELATED APPLICATIONS

This application claims priority from U.S. provisional patent application Ser. No. 60/834,490 filed Aug. 1, 2006, which is incorporated herein by reference in its entirety.

MICROFICHE APPENDIX

Not applicable.

TECHNICAL FIELD

This application relates to photonic crystals that are periodically structured having photonic band gaps for certain frequencies in general, and to chromogenically tunable photonic crystals, in particular. Furthermore, the application, in general, relates to photonic crystals that are periodic structures having photonic band gaps (PBG) for certain frequencies. It further relates, in particular, to such photonic crystals made of transition metal oxides with chromogenic properties enabling the reversible tuning of the said PBG through various external stimuli bringing about the reversible change in the optical properties.

BACKGROUND OF THE INVENTION

Photonic crystals are periodically structured electromagnetic media possessing photonic band gaps ("PBG") for certain range of frequencies, the PBG being mainly a function of the spatial periodicity parameters of the crystal and the refractive indices of the base material(s)[1,15]. By controlling these physical aspects of the photonic crystals one can generate a wide range of PBGs as per the need of the required application. The application of PBGs range from small-scale optical interconnects/circuits for all-optical signal processing to very narrow wavelength light sources to narrow wavelength filters and optical switches. Hence, there has been an enormous interest in photonic crystal research in the last few years in order to exploit the photon manipulation possibility they offer.

Most photonic crystals, however, have specific properties that cannot be varied once the crystals are made. Hence it is highly desirable to have the PBG tunability in a single photonic crystal by various external effects as it would lead to other interesting photonic components such as optical switches, tunable filters and optical interconnects/circuits. This possibility to dynamically control the photonic properties of the crystals through various external influences has led to the fabrication and study of a wide variety of tunable photonic crystals. The ultimate aim is to maximize the optical frequency (wavelength) range over which tunability can be achieved and the response speed of the tunability.

One type of prior art tunable crystal relies on the reversible change of the physical attributes of the photonic crystal such as the lattice spacing while another relies on the tunability of the refractive indices of the crystal material through various external effects. The physical aspect change has been achieved either through mechanical[16], piezoelectric[17], electrical/magnetic[18] effects among others. Refractive index tunability has been proposed through the effects of electric field in liquid crystals[19] as well as the infiltration of liquid crystal and polymeric[20] components in periodic structures.

Other methods of achieving tunability such as the variation of free electron carriers through temperature variation in semiconductors[21] and alteration of electric permittivity or magnetic permeability through external magnetic and electric fields[22] have also been proposed.

The tuning of the PBG of photonic crystals based on the phenomenon of electrochromism ("EC") has been proposed by the inventors in which a reversible optical property change can be induced in some transition metal oxide ("TMO") thin films such as Tungsten trioxide (WO3) through the double injection of ions and electrons[5]. The ensuing change in the optical constants through the application of a small electric field and the said double insertion/extraction brings about the PBG tunability. This EC phenomenon is very practically amenable to the fabrication of small scale photonic crystal devices based on inverse opals of the TMOs.

Transition metal oxides (TMO) with their multiple oxidation state present a variety of interesting properties of which the reversible EC coloration under ion/electron injection has attracted lot of research attention lately due to its rich application potential in smart windows, display devices, optical modulators etc[3]. The bulk of the research on TMOs is directed towards the tungsten trioxide thin films which are found to be the best candidates for EC application.

Through our earlier work[5] carried out on Tungsten trioxide based inverse opal photonic crystals, we have amply demonstrated the possibility of PBG tunability under the lithium atom intercalation and the underlying EC phenomenon. A continuous tunability of two Bragg diffraction peaks in the hexagonal macroporous structure could be achieved. This earlier work served as a distinct tool to verify the potential for tunability as the inserted lithium atoms could not be extracted from the applied sample configuration to examine the reversible operation.

The present disclosure relates to the fabrication of a complete electrochromically tunable photonic crystal device to achieve both insertion and extraction of the ion/electron species, and to chromogenically tunable photonic crystal devices generally.

SUMMARY

According to one aspect of the present invention, there is provided: a method of fabrication of an electrochromically tunable photonic crystal device, the method comprising the steps of: (a) providing a first transparent conductor coated glass having a film side comprising the transparent conductor coating; (b) providing an electrochromic transition metal oxide inverse opal structure; (c) providing electrolyte solution as a source of metal ions; (d) providing a second transparent conductor coated glass having a film side comprising the transparent conductor coating; and (e) sandwiching the electrochromic transition metal oxide inverse opal structure and the electrolyte solution between the film side of said first transparent conductor coated glass and the film side of the second transparent conductor coated glass.

According to another aspect of the present invention, there is provided: an electrochromically tunable photonic crystal device comprising: (a) a first Indium Tin Oxide (ITO) coated glass having a film side comprising the ITO coating, the film side capable of acting as a first electrode; (b) an $WO_3$ inverse opal layer structure provided in contact with the film side of the first ITO coated glass; (c) a $LiClO_4$ in Polypropylene Carbonate ($LiClO_4$/PC) solution provided in contact with the $WO_3$ inverse opal structure; and (d) a second ITO coated glass having a film side comprising the ITO coating, the film side capable of acting as a second electrode in contact with the LiClO$_4$/PC solution; whereby the application of an electric field between the first and second electrodes would result in reversible coloration by reversible formation of tungsten bronze (Li$_x$WO$_3$) as follows: WO$_3$ (transparent)+xe$^-$+xLi$^+$ ↔Li$_x$WO$_3$ (blue).

According to yet another aspect of the present invention, there is provided: an electrochromically tunable photonic crystal device comprising: (a) a first transparent conductor coated glass having a film side comprising the transparent conductor coating, the film side capable of acting as a first electrode; (b) an electrochromic transition metal oxide inverse opal layer structure provided in contact with the film side of the first transparent conductor coated glass; (c) an electrolyte solution as a source of metal ions provided in contact with the electrochromic transition metal oxide inverse opal structure; and (d) a second transference coated glass having a film side comprising the transparent conductor coating, the film side capable of acting as a second electrode in contact with the electrolyte solution; whereby the application of an electric field between the first and second electrodes would result in reversible coloration by reversible reaction as follows: [electrochromic transition metal] (bleached)+xe$^-$+x [metal ion]$^+$↔[metal ion]$_x$[electrochromic transition metal] O$_3$(colored).

According to still yet another aspect of the present invention, there is provided: a chromogenically tunable photonic crystal device comprising: (a) a substrate; and (b) a transition metal oxide inverse opal layer structure provided in contact with the substrate; whereby the application of an external stimuli results in reversible coloration of the transition metal oxide inverse opal layer structure.

Other aspects and features of the present invention will become apparent to those ordinarily skilled in the art upon review of the following description of specific embodiments of chromogenically tunable photonic crystals in conjunction with the accompanying drawing figures.

BRIEF DESCRIPTION OF THE DRAWINGS

Embodiments of the present invention will now be described, by way of example only, with reference to the accompanying drawing figures, wherein.

Referring to the drawings.

Like reference numerals are used in different figures to denote similar elements.

DETAILED DESCRIPTION OF THE DRAWINGS

Preparation of Polystyrene Colloidal Crystal Templates

Figure 1:
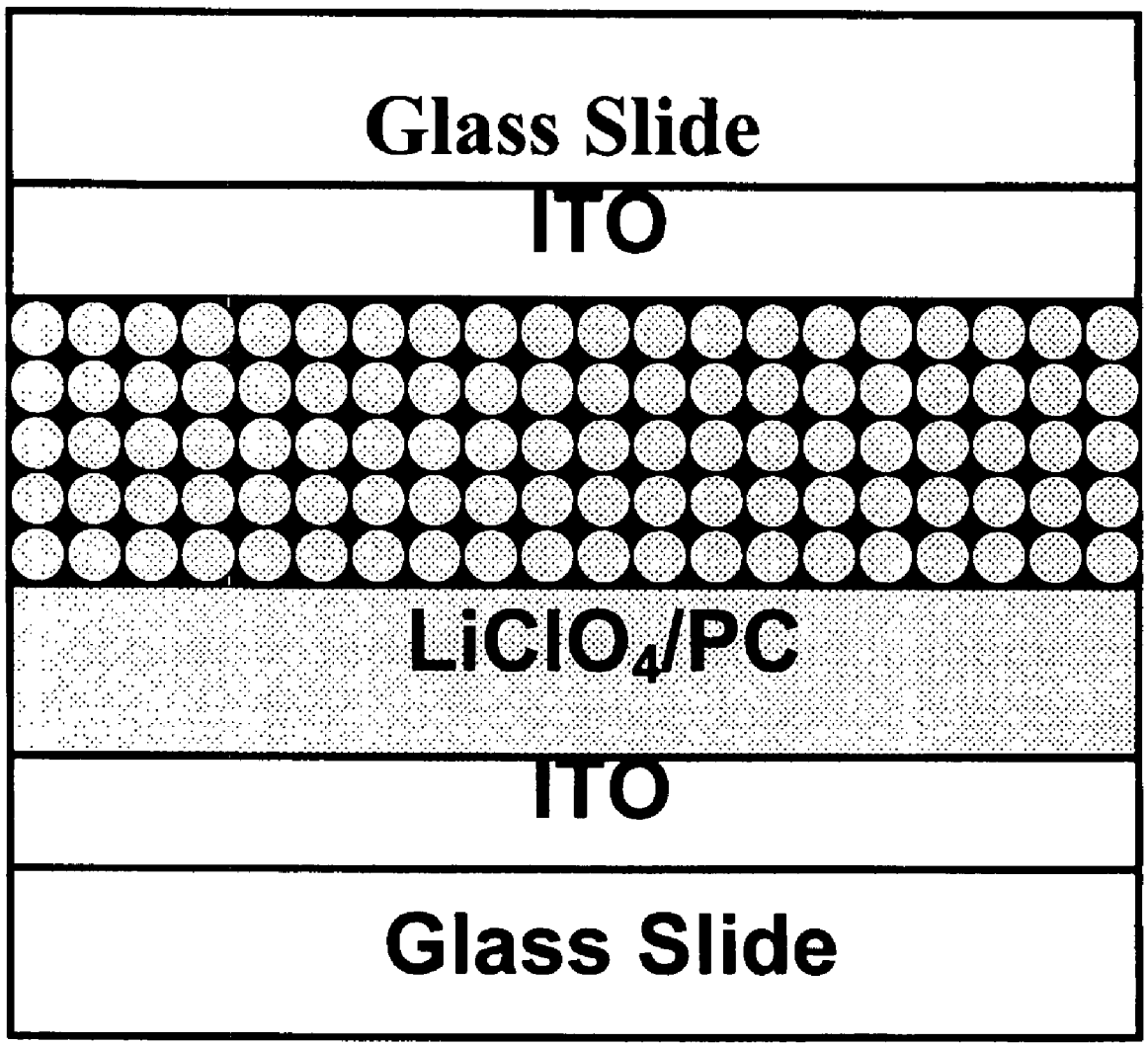
FIG. 1 illustrates an electrochromic-photonic crystal ("EC-PC") device with a six component configuration, provided in accordance with one embodiment of the present invention.

Polystyrene colloidal crystal templates were grown onto cleaned Indium Tin Oxide (ITO) coated glass substrates through a convective assembly process[23]. The substrates were placed vertically into a vial filled with aqueous solution of polystyrene monodisperse spheres. A slit was carved into the cap of the vial and the substrates were placed vertically in the vial for two reasons: 1) to keep the evaporation of the solvent near the substrate; 2) to facilitate the vertical positioning of the substrate. Table 1 summarizes the process of growing polystyrene colloidal crystal templates used in one embodiment of the present invention:

TABLE 1 summary of polystyrene colloidal
crystal templates growing process

| | |
|---|---|
| Materials: | Polystyrene monodisperse spheres in water (Bangs Laboratories, Inc.) |
| Sphere Size: | 200~400 nm |
| Volume fraction: | 0.1%~0.2% (about 1 to 1.5 drop of 10% polystyrene spheres per 5 ml water) |
| Substrate: | ITO glass |
| Temperature: | 60° C. |
| Period: | 1 week |

For sphere size exceeding 600 nm, a temperature gradient is applied across the vial by placing the vial in a sand bath on a hot plate[28].

Preparation of Tungsten Oxide Sol

The $WO_3$ sol was prepared according to the method proposed[24] by Cronin et al. Metallic Tungsten was dissolved in Hydrogen peroxide (30%) and acetic acid at 0° C. during 24 hours. The solution was filtered and then evaporated to dryness, resulting in a Tungsten peroxy acid powder that reacts at room temperature with ethanol to form a Tungsten peroxyester derivative dipping solution. Table 2 summarizes the steps for one embodiment of the process of preparation of tungsten oxide sol, provided in accordance with the present invention:

TABLE 2

Steps for one embodiment of the process of preparation of tungsten oxide sol

| Steps | Acts |
|---|---|
| A. Preparing reacting liquid for tungsten peroxy acid product | 1. Deionized water (12.5 ml) + Hydrogen peroxide (31%, 125 ml) + Glacial acetic acid (125 ml) Mixed in 500 ml pear-shaped flask in an ice bath.<br>2. Add 20.3 g tungsten metal gradually.<br>3. React for 24 hrs. |
| B. Constraining the preparing reacting liquid step | 4. The reacting liquid should not exceed half the volume of the flask to ensure sufficient cooling.<br>5. The reacting flask cover should not be sealed. Tungsten powder should be added gradually instead of once altogether.<br>********** |
| C. Obtaining tungsten peroxyester derivatives from tungsten peroxy acid product in reacting liquid | 6. Remove the remaining solids by filtering. (Filter paper No. 5 or 6)<br>7. The obtained liquid was dried under vacuum to recover tungsten peroxy acid product (55~60° C.)<br>8. 50 g powder reacts with 250 ml dry ethanol to produce tungsten peroxyester derivatives<br>9. Stir + air dry (overnight)<br>********** |
| D. Obtaining sol from tungsten peroxyester derivatives | 10. 31 g peroxyester + 70 ml ethanol = sol (stirring for 24 hrs)<br>********** |
| E. Removing the precipitate | 11. Aging the sol for 24 hrs, remove the precipitate if there's any.<br>********** |

Table 3 summarizes the equipment and materials recommended to accomplish the steps of Table 2:

TABLE 3

Equipment and Materials needed for the process of preparation of tungsten oxide sol

| Category | Item |
|---|---|
| Security: | 1. facial mask<br>2. gloves<br>3. lab apron |
| Materials: | 4. Deionized water<br>5. Hydrogen peroxide (31%)<br>6. Glacial acetic acid<br>7. Tungsten metal powder (1-5 micron) |
| Glassware & Equipment: | 8. ice bath, thermometer<br>9. stirring plate, stir bar<br>10. vacuum evaporator (in chemistry department)<br>11. pear-shaped flask (500 ml)<br>12. graduated cylinders (50 ml × 2, 10 ml)<br>13. funnel, filtrate paper<br>14. flask with side arm (250 ml)<br>15. flask for evaporator (500 ml)<br>16. porcelain dish<br>17. beaker (100 ml)<br>18. flask (125 ml)<br>19. plastic film + rubber band |

Preparation of ITO/$WO_3$ Inverse Opal Structures

The crystalline template formed on the ITO glass substrate was immersed vertically in the $WO_3$ sol for 5 minutes, where due to capillary forces the latter penetrated the voids in the template. Gelation of the sol into the voids happened shortly after the template was pulled out of the solution. This was followed by drying the sample at 80° C. for half an hour. The cycle of dipping and drying was repeated several times in order to incorporate more material into the template. The resulting polystyrene-gel composite was sintered at 460° C. for 1 hour to remove the polystyrene template, leaving, a fully porous $WO_3$ inverse opal structure. Table 4 summarizes the technique of preparation of ITO/$WO_3$ inverse Opal structures, provided in accordance with one embodiment of the present invention:

TABLE 4

Dip-infiltrating sol-gel technique

| | |
|---|---|
| Instrument: | Dip-coater |
| Lowering the template: | at a speed of 5000 (4 ml per second) |
| *Immersion time: | 5~10 mins (normally the longer the immersion time, the higher the filling fraction and the thicker the surface layer) |
| *Withdrawing speed: | 1200~2000 (0.96~1.6 ml per second) (normally the higher the speed, the thicker the surface layer, yet too low the speed, the filling fraction becomes low) |
| Drying: | 80° C. for half an hour |
| *Dipping/Drying cycles: | 2~3 times (the more the cycles, the higher the filling fraction, yet the thicker the surface layer) |
| Sintering: | 460° C. for 1 hour |

***The object is to try to improve the filling fraction of the pores while avoiding thickening of the surface layer.

Note: In some of the cases the inverse opal structures were inserted with lithium atoms prior to the assembly of the EC-PC cell to facilitate the fabrication and to optimize the lithium content and hence the coloration of the system. This lithiation was carried out by a dry in-situ method as mentioned Ref. 10. Kuai et al.

Assembly of an ITO/$WO_3$ Inverse OPAL‖$LiClO_4$/PC‖ITO Device

The $WO_3$ inverse opal based photonic crystal device was then completed by sandwiching the ITO/$WO_3$ inverse opal and a plain ITO glass (with the films facing each other) with a plastic spacer of couple of microns in between and all around except for a small opening forming a channel to receive the $LiClO_4$/PC solution. Then a small pressure was applied to the sandwich structure with couple of paper clips while heating the entire setup to a temperature of around 260° C. for 20 to 30 seconds to melt the spacer and fuse the structure together. Then a liquid electrolyte of 1M LiClO$_4$ in Propylyne Carbonate ("PC") solution was sucked into the cell under vacuum through the small opening left in the spacer. As a final step, this small outlet was then blocked with silicone to prevent the leakage of the solution.

Referring to the drawings, FIG. 1 illustrates an electrochromic-photonic crystal ("EC-PC") device with a six component configuration, provided in accordance with one embodiment of the present invention. The application of a small electric field between the two ITO electrodes, with negative polarity to the WO3 inverse opal side, brings about the injection of electrons from one side and lithium ions stored in the electrolyte from the other into the WO3 periodic layer. This double injection results in the electrochromic coloration of the inverse opal layer with the reversible format on of tungsten bronze (Li$_x$WO$_3$) as follows:

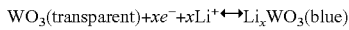

WO$_3$(transparent)+$xe^-$+$x$Li$^+$ ↔ Li$_x$WO$_3$(blue)

Upon reversing the polarity the system would return to its normal state.

Characterization Methods

A scanning electron microscope (SEM) (JSM-5200) was used to evaluate the microstructures of the samples. A Varian Cary-5000 spectrophotometer was used to measure the transmission and reflection spectra of the samples. In-situ optical characterization was made through the program Kinetics and Scankinetics of the spectrophotometer. A pro-100 benchtop digital multimeter with PC interface (Global Specialties) was used to obtain the I-t curves. The optical and electrochemical properties of ITO/WO$_3$ inverse opal samples before assembling the EC-PC device were measured using a similar 1 centimetre thick cell filled with 1M LiClO4/PC fitted with a platinum wire used as counter electrode.

Microstructure

Figure 2A:
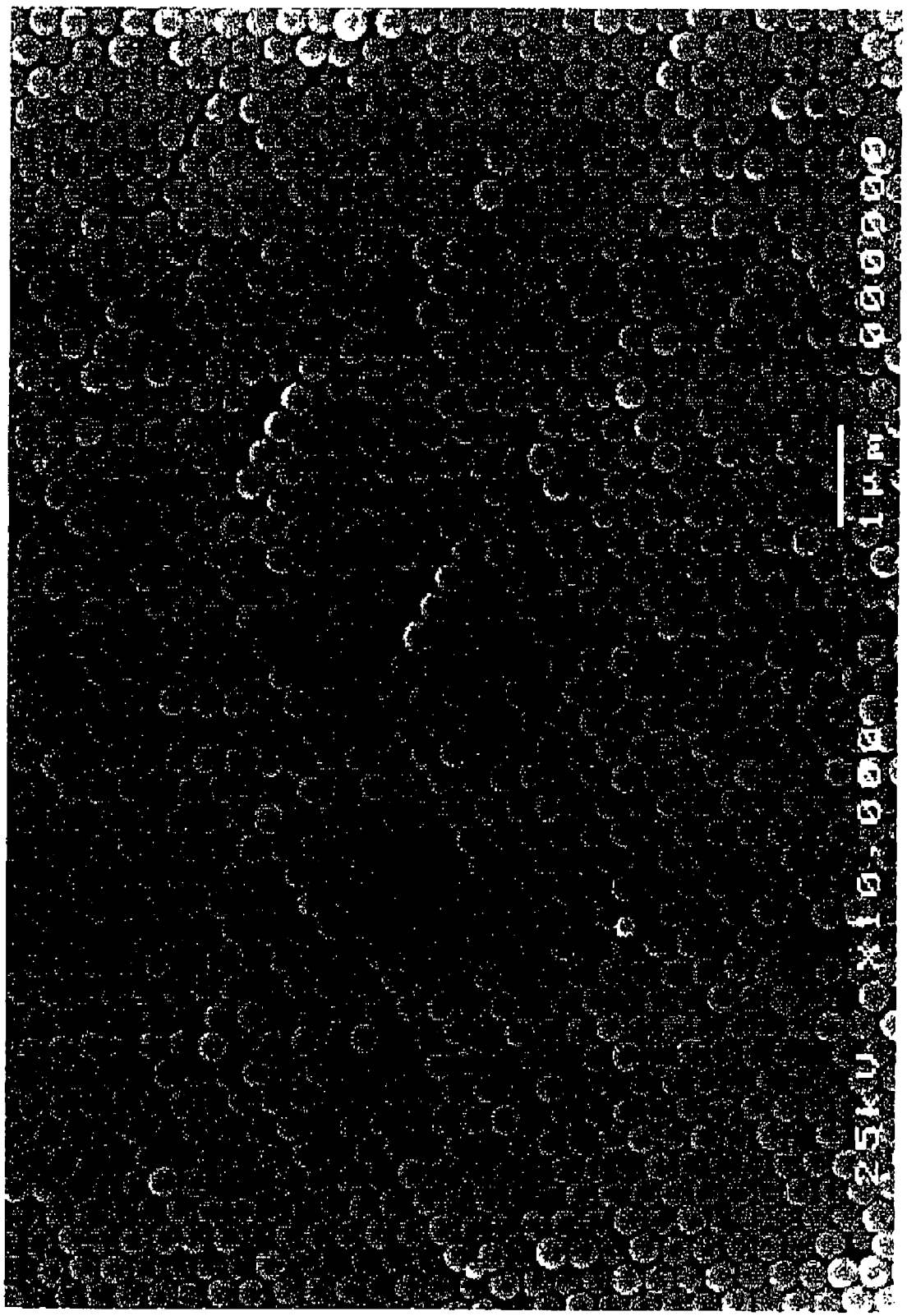
FIG. 2 shows examples of SEM images of the initial polystyrene template and the resulting WO$_3$ inverse opal.
Figure 2B:
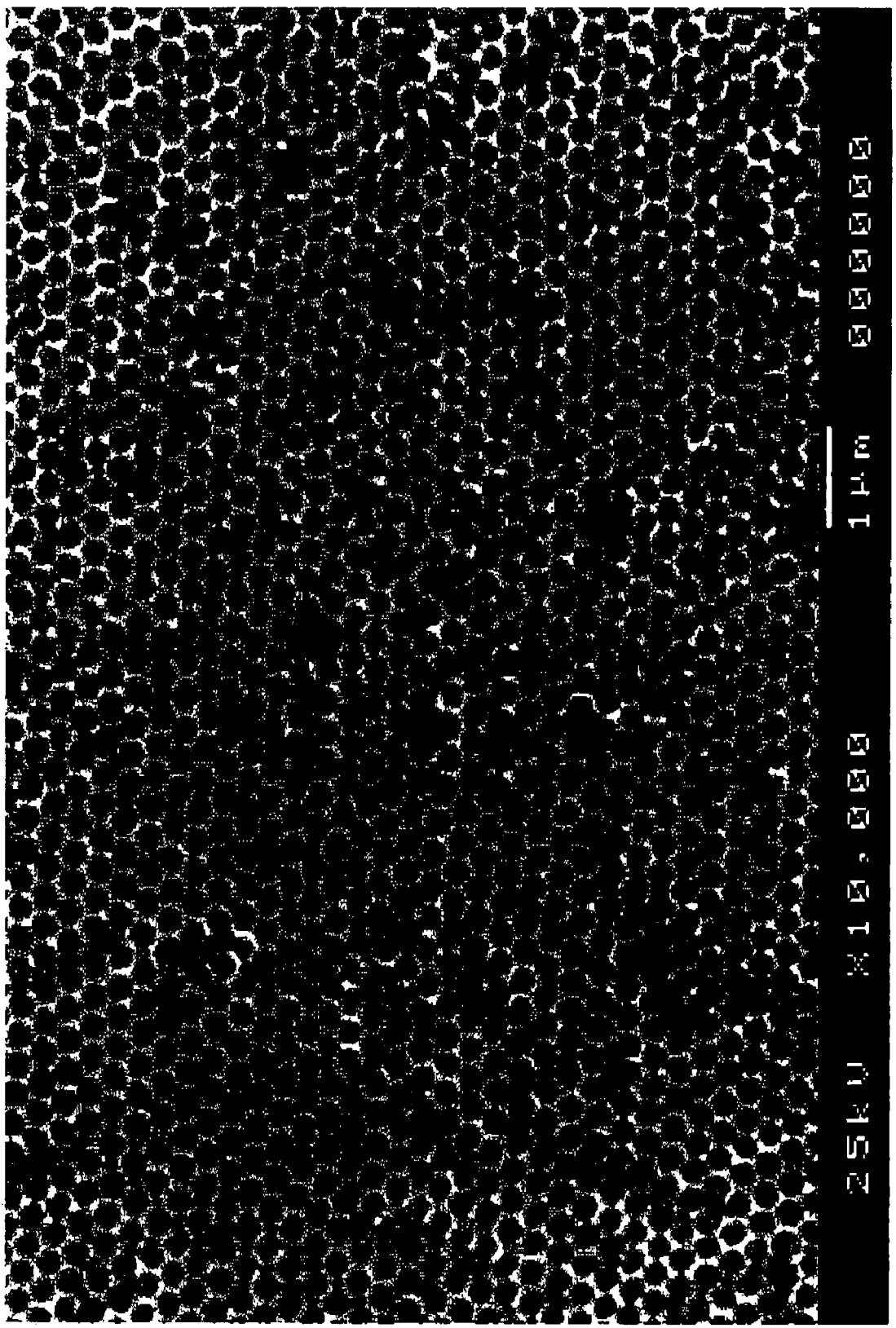

FIG. 2 shows examples of SEM images of the initial polystyrene template and the resulting WO$_3$ inverse opal. The micrographs indicate the appearance of ordered hexagonal macroscopic structures made of air pores and WO$_3$. It was seen that after the sintering the inverse opal structures yield a center-to-center distance of about 283 nm i.e. a shrinkage of around 6% compared to the original template of spheres of 300 nm. This shrinkage is much smaller than the Titania case[25] and similar to our earlier templates on glass[5]. Periodic inverse opal structures with fairly large area (12 mm×13 mm) were obtained that enabled the optical measurements in the spectrophotometer.

Static Optical Properties of Opal and Inverse Opal Structures

Figure 3A:
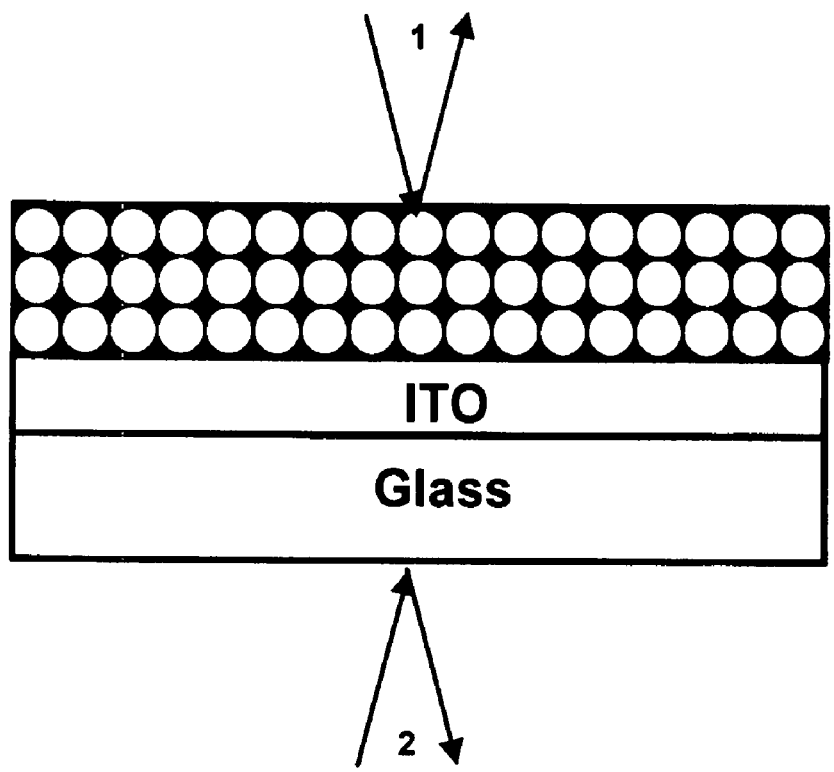
FIG. 3(a) illustrates a schematic configuration for measuring reflection spectra of samples on an ITO glass substrate, provided in accordance with one embodiment of the present invention.
Figure 3B:
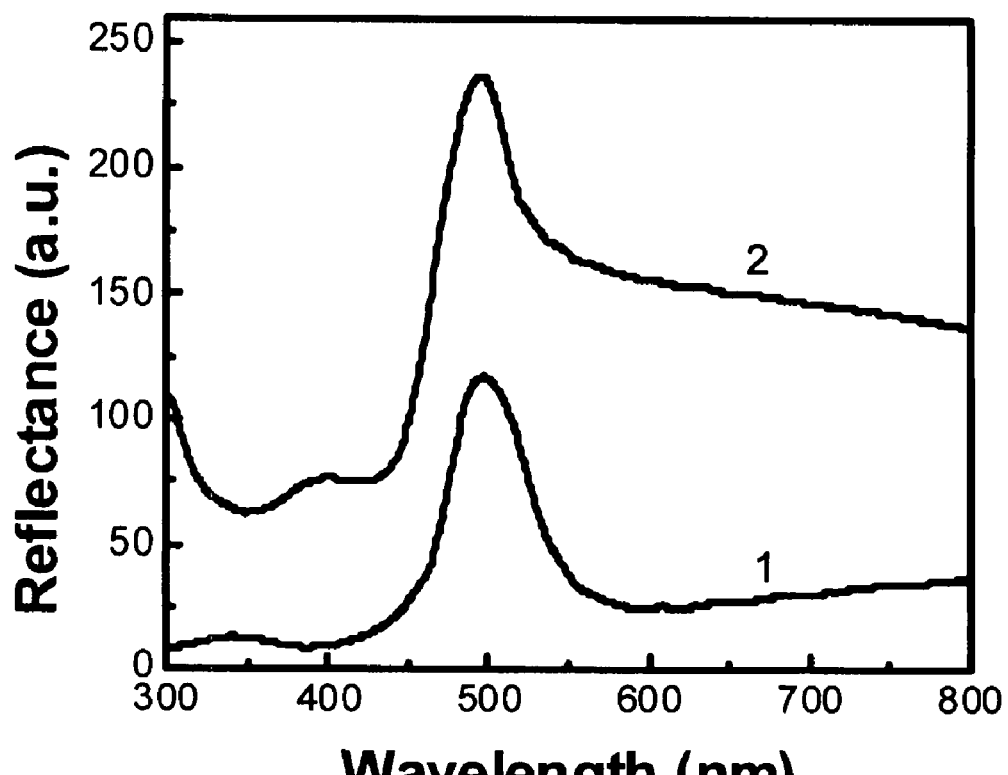
FIG. 3(b) illustrates the reflection spectra of a WO$_3$ inverse opal on an ITO glass substrate corresponding to FIG. 3(a)

The optical measurements were carried out in two configurations: 1) near-normal reflectance from the inverse opal surface side and 2) from the glass side as shown in FIG. 3(a), on the samples before the fabrication of the EC cell. FIG. 3(a) illustrates a schematic configuration for measuring reflection spectra of samples on an ITO glass substrate, provided in accordance with one embodiment of the present invention. FIG. 3(b) illustrates the reflection spectra of a WO$_3$ inverse opal on an ITO glass substrate corresponding to FIG. 3(a).

Figure 4:
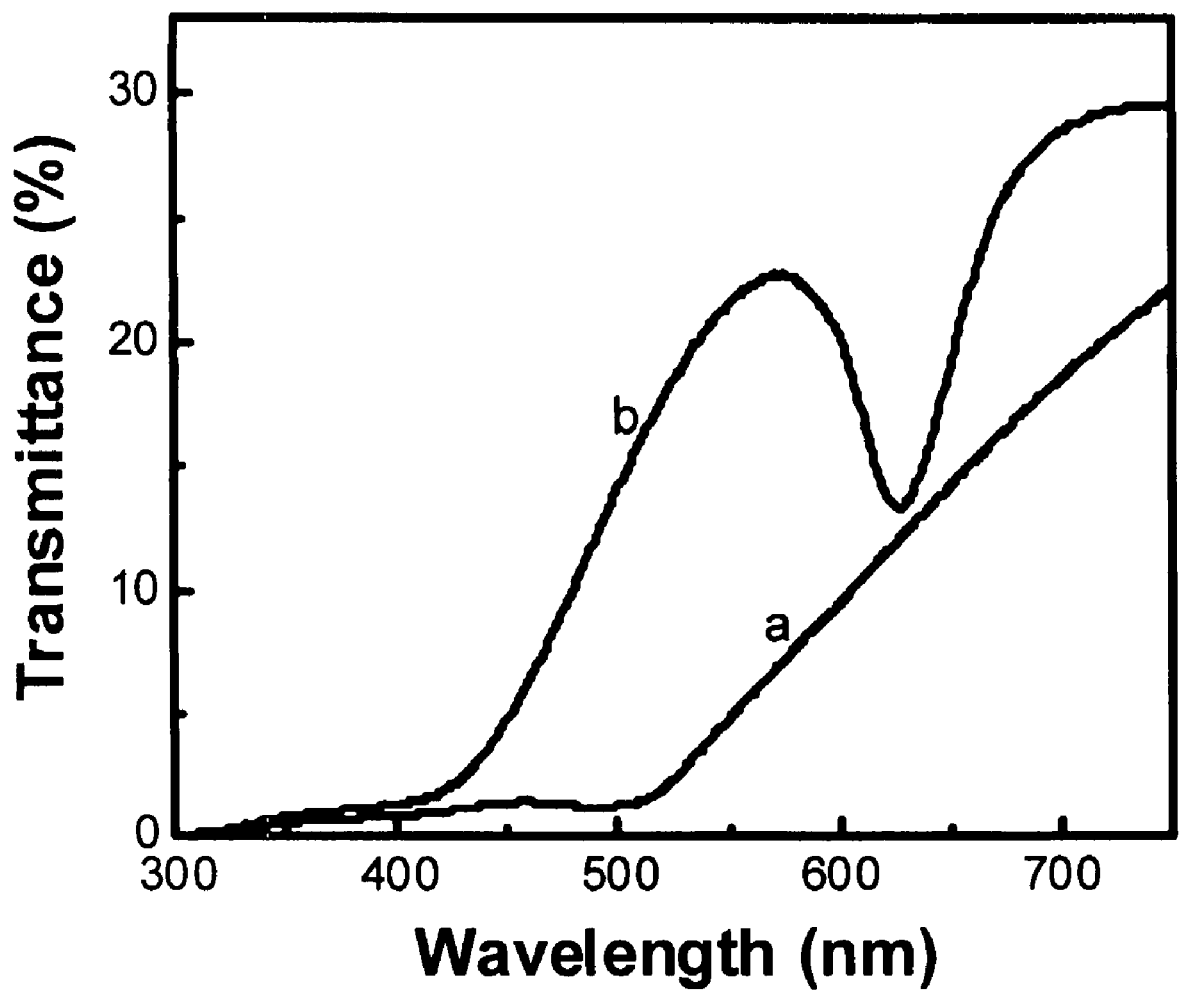
FIG. 4 shows the transmission spectra of the complete EC cell of FIG. 1 before and after the infiltration of the LiClO$_4$ in PC electrolyte.

A pronounced Bragg peak corresponding to the photonic stop band situated at around 500 nm is clearly evident in both the cases as shown in FIG. 3(b). The band position ($\lambda_c$) is a function of the lattice constants and the optical constants of the inverse opal structure. A very rough relation of this wavelength ($\lambda_c$) being the product of the air spacing (lattice size) and the refractive index of the dielectric inverse medium should put it at 566 nm assuming a refractive index of 2 as measured for a continuous film. This discrepancy is attributed to the variation of the film density in the inverse opal structure as compared to a continuous film. FIG. 4 shows the transmission spectra of the complete EC cell of FIG. 1 before and after the infiltration of the LiClO$_4$ in PC electrolyte. A clear shift of the peak to higher wavelength (around 640 nm) is clearly visible.

Electrically Tunable Optical Properties of WO$_3$ Inverse Opal Structure

As mentioned above, the experiment was carried out on an inverse opal substrate in a one-centimeter-thick glass cell filled with 1M LiClO$_4$/PC before the completion of the EC-PC cell. A platinum wire was used as counter electrode with an inverse opal of the size of around 12×13 mm$^2$. The measurements were carried out with the application of ±4V to this film on ITO coated glass. Given in FIG. 5 are the transmittance spectral changes as a function of time with the application of double insertion (−4V) and extraction (+4V) potential in this electrochemical cell.

Figure 5A:
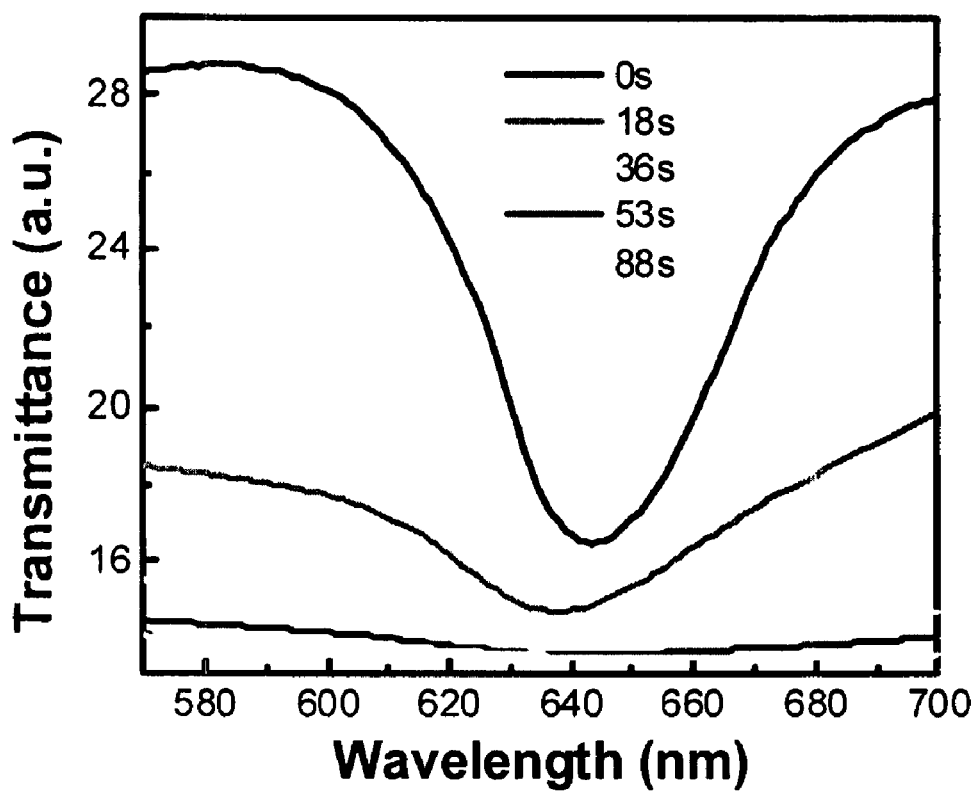
FIG. 5(a) shows the transmission spectra at normal incidence of the ITO/WO$_3$ inverse opal as a function of time under a voltage bias of −4V.

FIG. 5(a) shows the transmission spectra at normal incidence of the ITO/WO$_3$ inverse opal as a function of time under a voltage bias of −4V. Referring to FIG. 5(a), it can be clearly noticed that with increasing coloration under the double insertion the stop band shifts to lower wavelengths and rapidly loses its intensity. This is due to the increasing absorption which develops in the film suppressing the Bragg reflectance band seen earlier. This fast disappearance of the band indicates the dominant amorphous nature of the WO$_3$ inverse structure and that of the absorption modulation of the coloration. As is very well known, the WO$_3$ films exhibit EC coloration in both amorphous and polycrystalline form although the coloration mechanism is entirely different in each case. In purely crystalline state the insertion of electrons and their de-localization leads to classical Drude like metallic or heavily doped semi-conductor behavior while in the amorphous case, the localization of the inserted electrons leads to small polaron-like absorption[3]. Hence, the coloration is predominantly through reflectance modulation in the former case while it is through absorption modulation in the latter. It is invariably found that the WO$_3$ films exhibit a mixed phase coloration[26]. In the present case the film seems to exhibit a predominantly amorphous or absorption modulated behavior as evidenced from the broadband absorption seen in FIG. 5. However, the appearance and the shifting of the photonic band is an indication of the change in the refractive index of the film associated with the quasi-free electron contribution. Measurement of the reflectance spectra of this sample can indicate more clearly the changes brought about by the reflectance modulation. Due to the present configuration of the 1-cm thick electrochemical cell these measurements could not carried out. As discussed below these measurements are carried out in the case of the thinner EC-PC device.

Figure 5B:
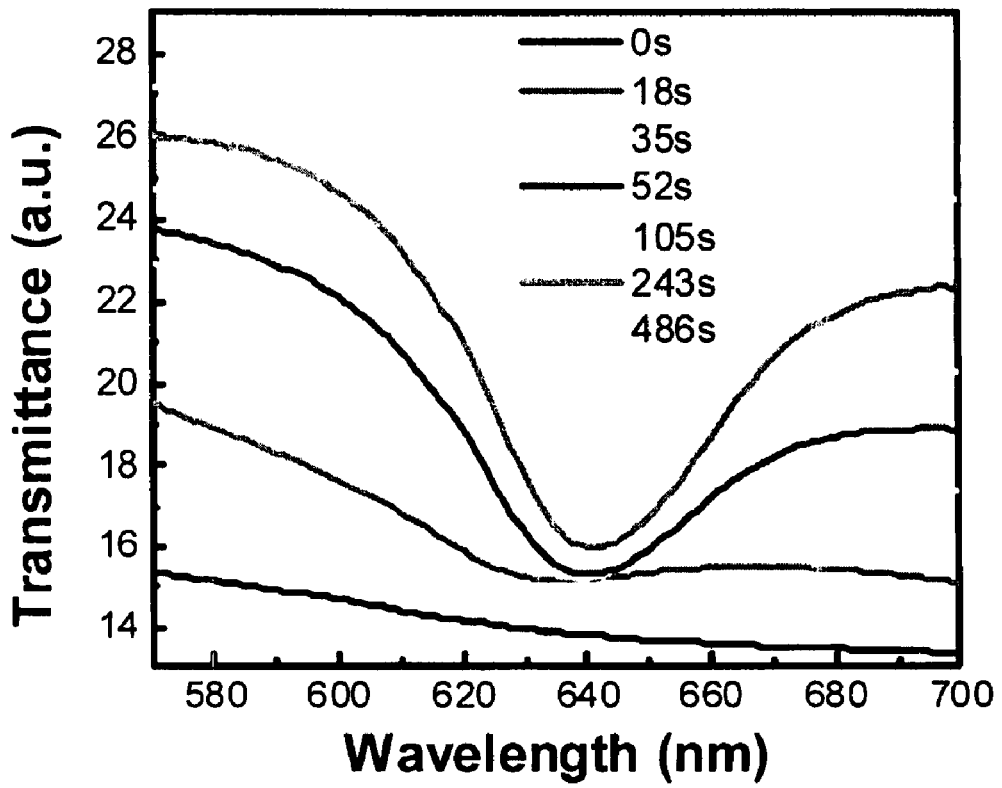
FIG. 5(b) shows the transmission spectra at normal incidence of the ITO/WO$_3$ inverse opal as a function of time under a voltage bias of +4V.
Figure 6:
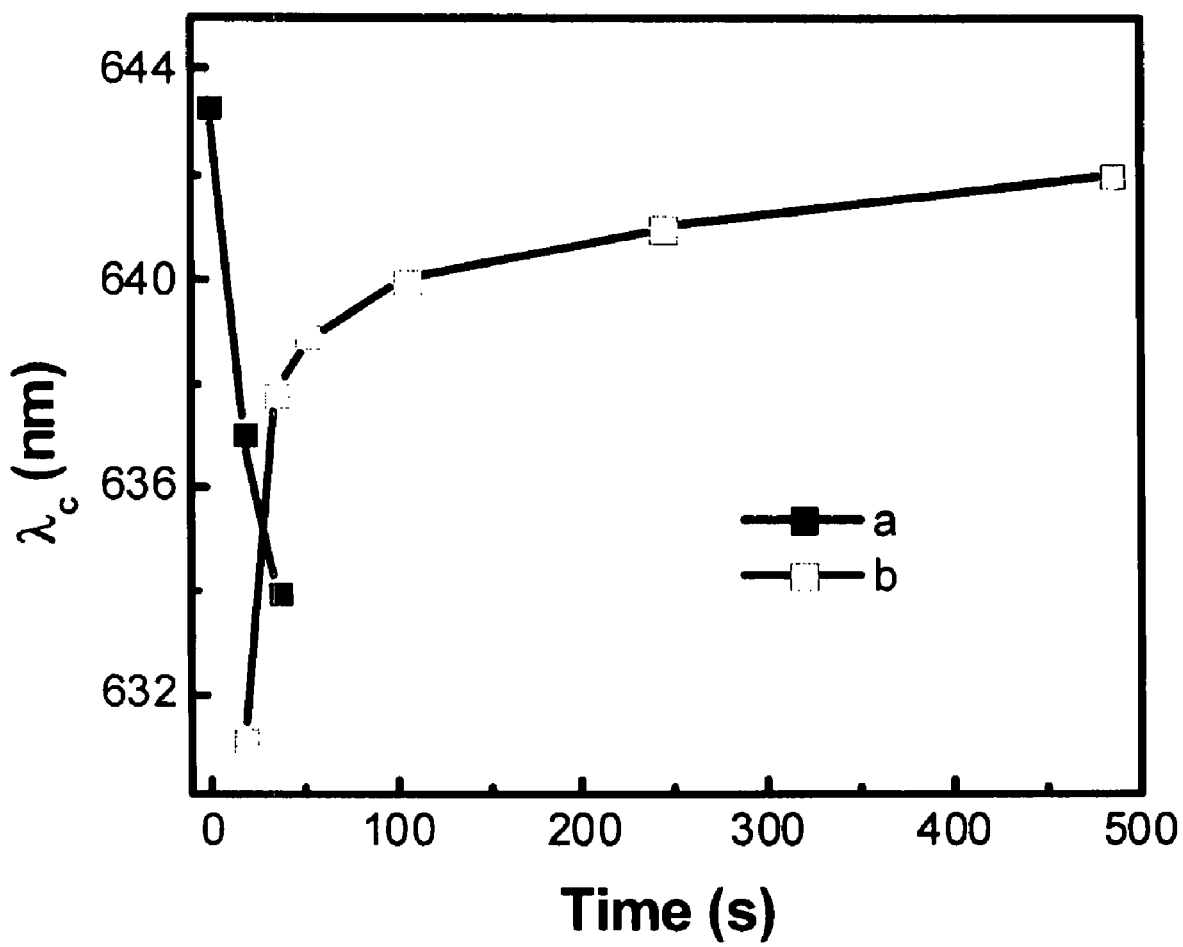
FIG. 6 shows the peak wavelength $\lambda_c$ of transmission band as a function of time, curves (a) and (b) corresponding to FIGS. 5(a) and 5(b) respectively.

FIG. 5(b) shows the transmission spectra at normal incidence of the ITO/WO$_3$ inverse opal as a function of time under a voltage bias of +4V. It is also seen in FIG. 5 that under −4V (coloration) potential, the transmission band shifts towards shorter wavelength by about 9 nm, while under +4V (bleaching) potential, the transmission band shifts back to longer wavelength by about 11 nm, as shown in FIG. 6. FIG. 6 shows the peak wavelength $\lambda_c$ of transmission band as a function of time, curves (a) and (b) corresponding to FIGS. 5(a) and 5(b) respectively. The figure also shows the temporal efficiency of the coloration and slow reversibility of the process.

Figure 7:
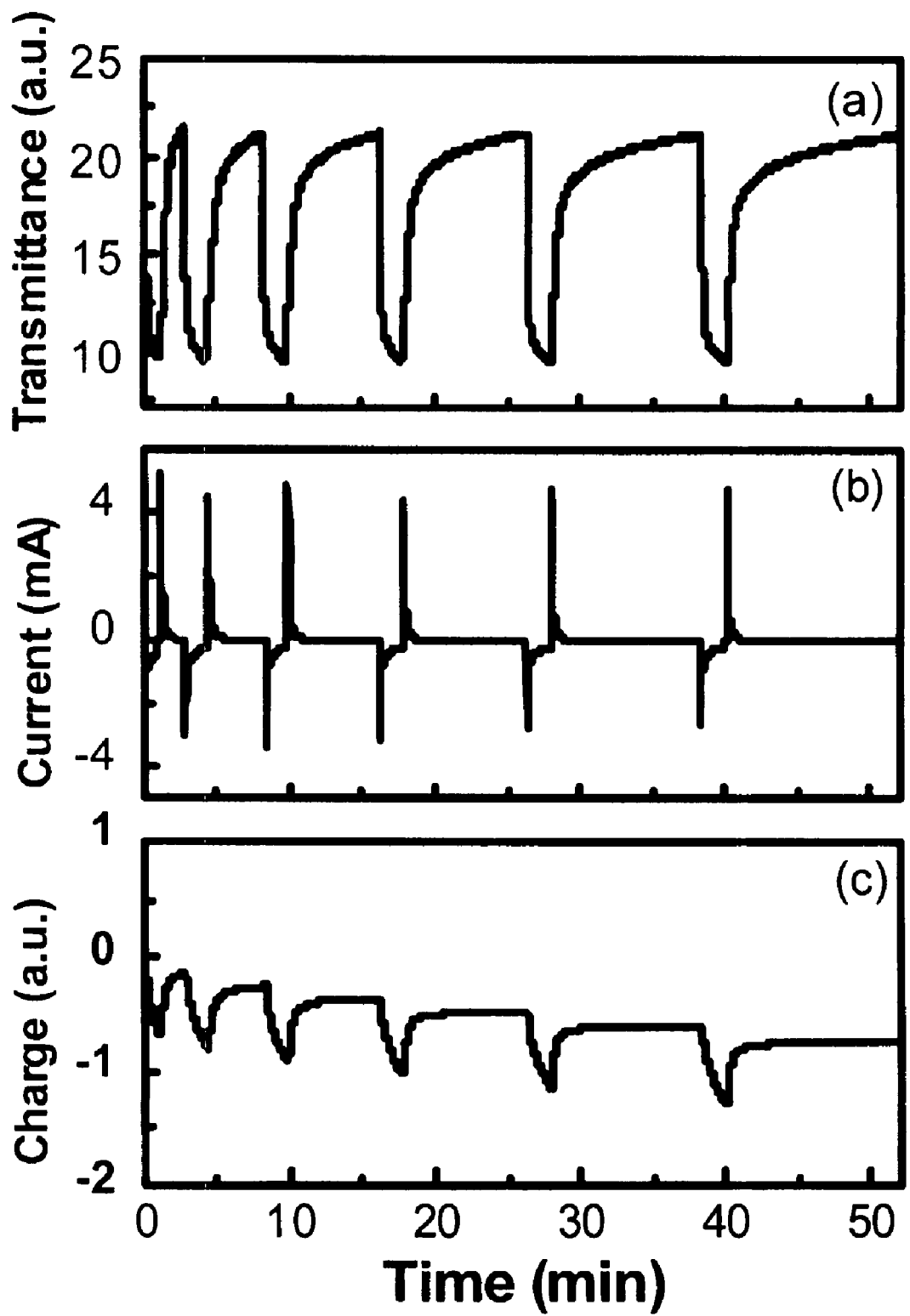
FIGS. 7(a),(b) and (c) show the transmittance changes, the current and charge inserted/extracted from the device of FIG. 1 as a function of time respectively.

FIGS. 7(a),(b) and (c) show the transmittance changes, the current and charge inserted/extracted from the device of FIG. 1 as a function of time respectively. It can be seen that, although reversible, both the coloration and bleaching processes take longer time with increasing cycles. FIG. 7(c) shows that with every cycle there is an accumulation of charge in the inverse opal due to the irreversibility of the process. Reversibility can be improved by using a different combination of coloration and bleaching voltage without producing any unwanted secondary effects.

Electrically Tunable Optical Properties of the EC-PC Device

When making devices with small thickness such as around 20 μm, the uniformity of the thickness of the cell becomes very critical forcing sometimes the use of very high voltages of up to 45V in order to activate the device. Such high voltages can lead to some secondary reactions such as the decomposition of any water molecules contained in the electrolyte into $H_2$ and $O_2$ as evidenced sometimes by the appearance of small bubbles coming up. In the EC-PC devices disclosed herein fabricated with very thin plastic spacer no such side effects were seen and the devices could be activated with lower potentials.

Figure 8A:
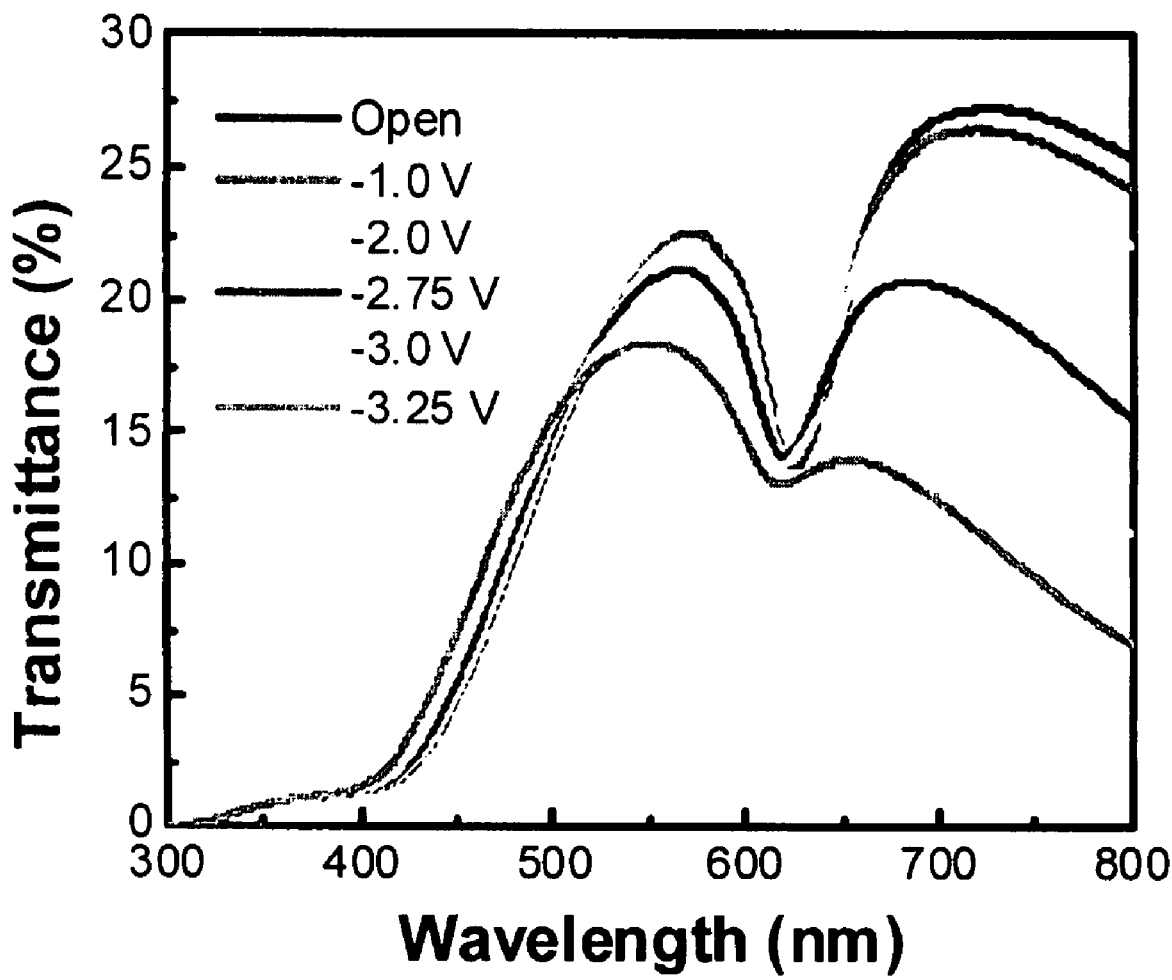
FIG. 8(a) illustrates transmission spectra at normal incidence of the cell of FIG. 1 as a function of negative applied voltage.
Figure 8B:
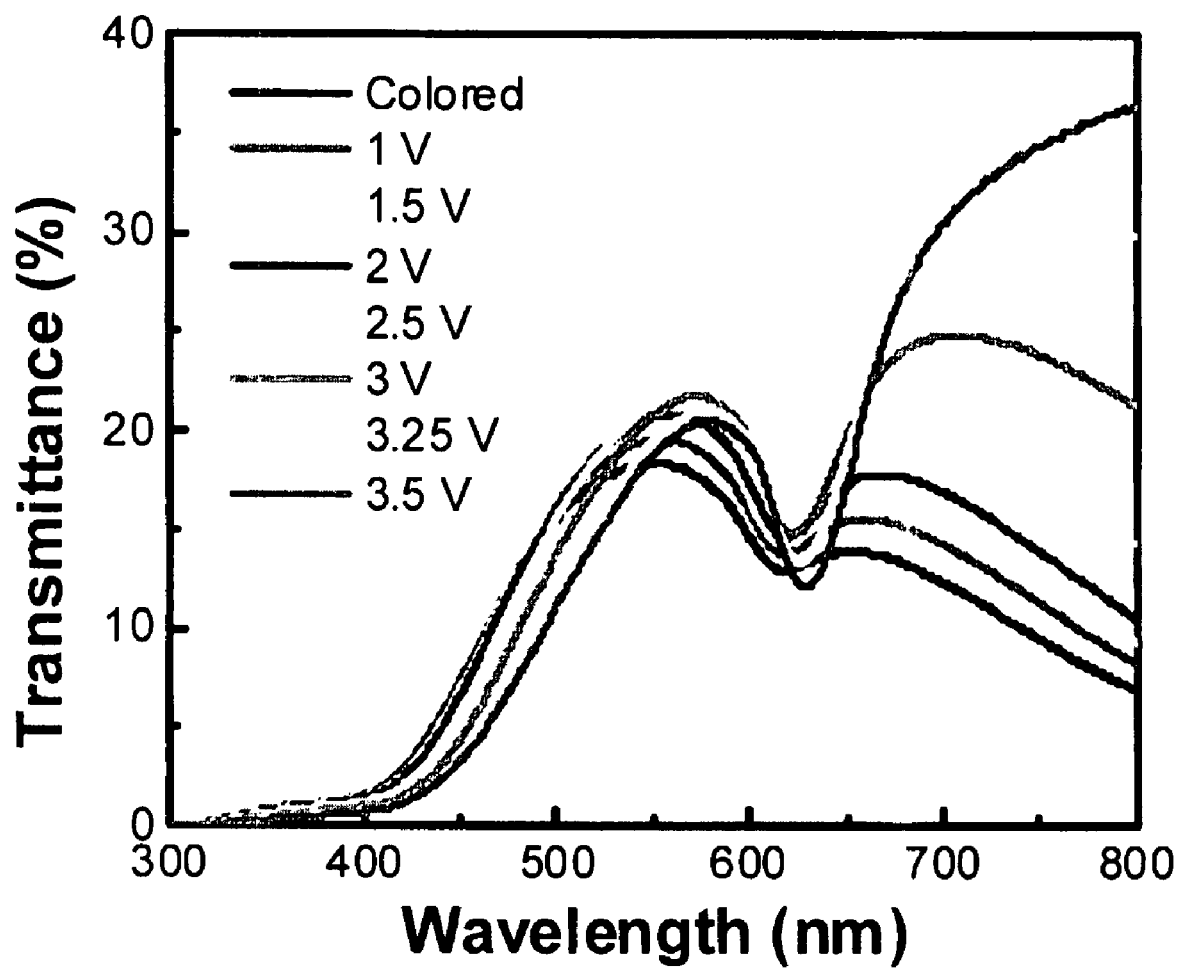
FIG. 8(b) illustrates transmission spectra at normal incidence of the cell of FIG. 1 as a function of positive applied voltage.
Figure 8C:
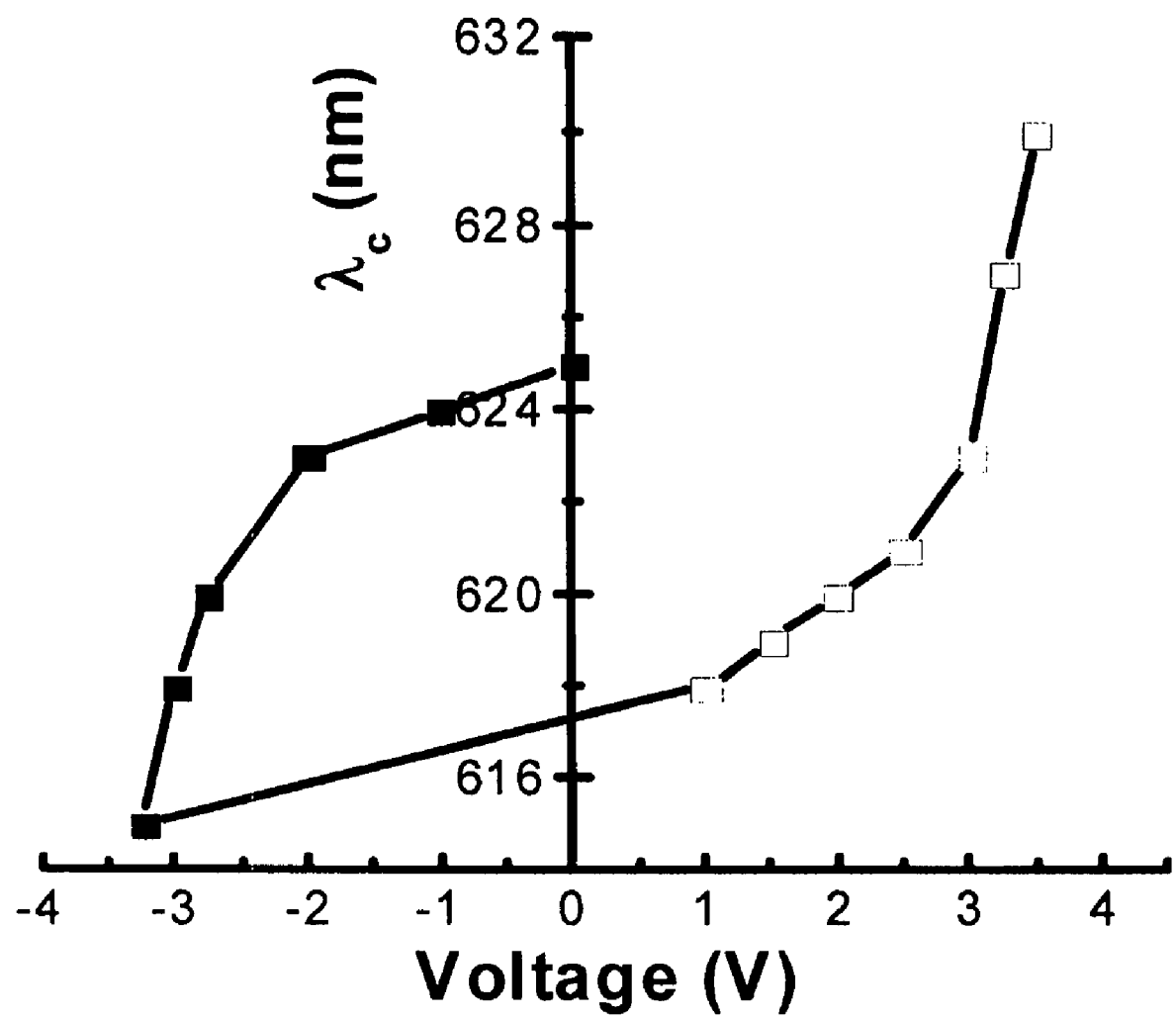
FIG. 8(c) illustrates peak wavelengths $\lambda_c$ of transmission band as a function of applied voltage to the device of FIG. 1
Figure 8D:
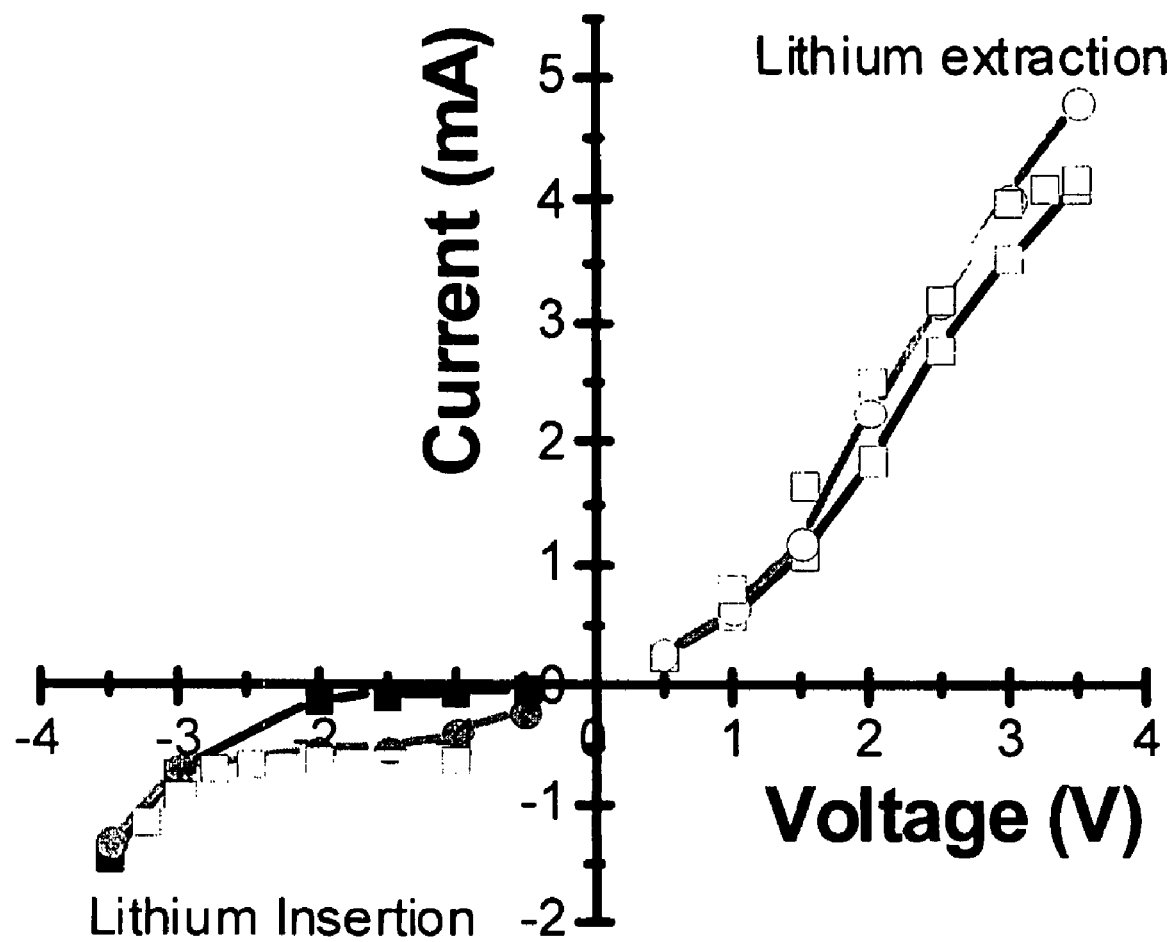
FIG. 8(d) illustrates the relation between current vs. voltage applied to the device of FIG. 1.

FIG. 8(a) illustrates transmission spectra at normal incidence of the cell of FIG. 1 as a function of negative applied voltage. FIG. 8(b) illustrates transmission spectra at normal incidence of the cell of FIG. 1 as a function of positive applied voltage. FIG. 8(c) illustrates peak wavelengths $\lambda_c$ of transmission band as a function of applied voltage to the device of FIG. 1. FIG. 8(d) illustrates the relation between current vs. voltage applied to the device of FIG. 1.

In FIGS. 8(a)-(b) is given the lithium insertion process as a function of applied voltage. Similar to the earlier case the stop band shifts towards lower wavelengths with increasing potential. A shift between 626 nm and 615 nm is seen with the application of 3.5 Volts of insertion potential. A reversing of coloration takes place with the application of extraction potential to the device as shown in FIG. 8(b). Increasing the positive voltage up to 3.5 V the transmission band ships towards longer wavelengths between 615 nm and 630 nm. This tendency in both the EC-PC devices to shift the stop band over a longer wavelength range during extraction than during the coloration process indicates the slight initial coloration of the "as fabricated" device which is a common occurrence in the EC devices. These changes in the thin EC-PC device also indicate an incomplete reversibility associated by the change in the nature of the optical behavior of the film but provide a testimony to the photonic tunability of the device. This behavior is also reflected in the initial shift during insertion and extraction processes as shown in FIG. 8(c). The I-V curves relating to three insertion and extraction cycles are shown in FIG. 8(d). These initial electrical characteristics are acceptably reversible.

Figure 9A:
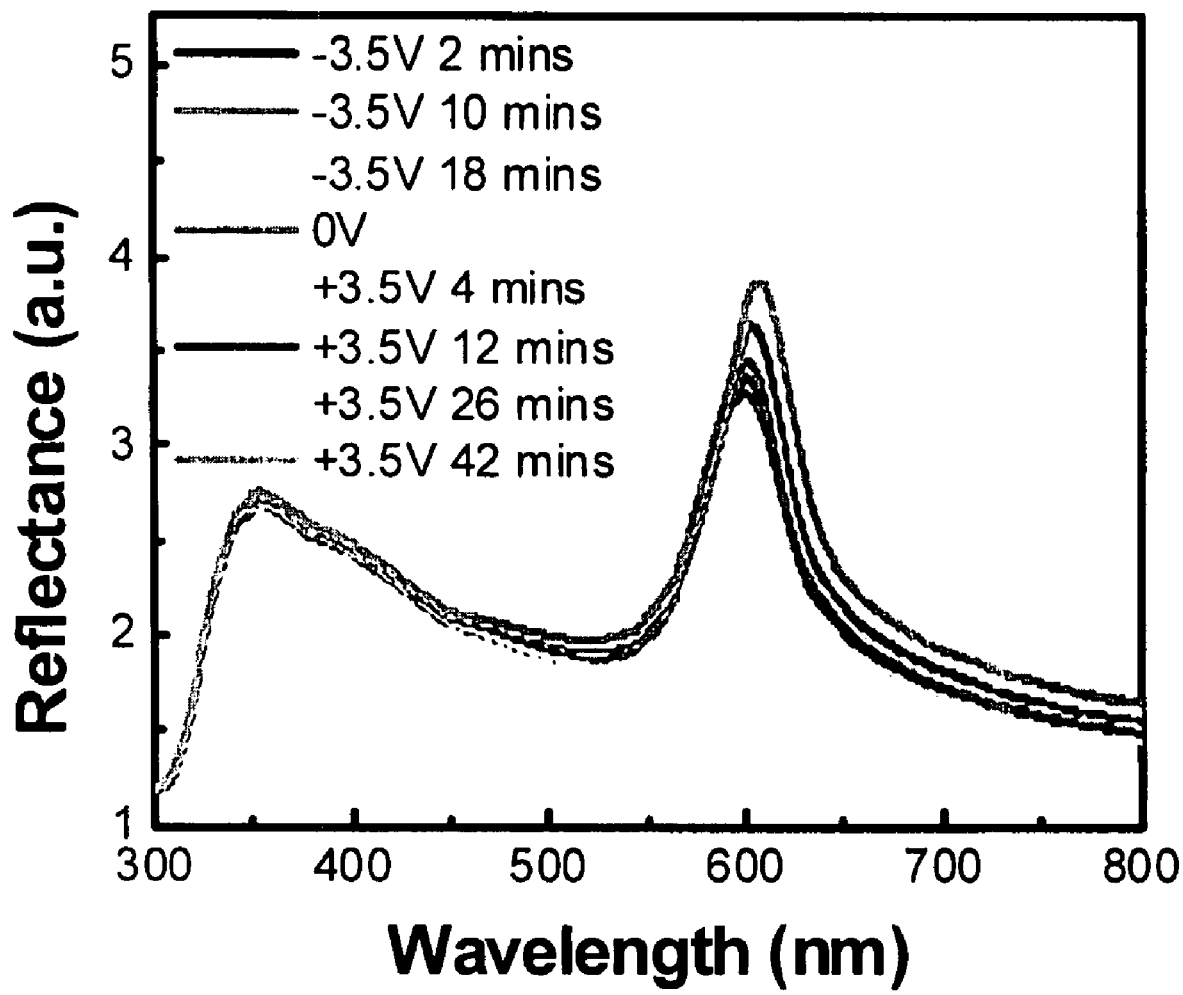
FIG. 9(a) shows the reflectance spectra relating to the insertion and extraction of the device of FIG. 1. It can be seen that the reflection band shifts between 599 nm and 608 nm.

FIG. 9(a) shows the reflectance spectra relating to the insertion and extraction of the device of FIG. 1. It can be seen that the reflection band shifts between 599 nm and 608 nm. It is to be noted that the reflection measurement were done at position 2 in FIG. 5(a). The configuration of the measurement was one reason that causes the mismatch of the reflection band with the transmission band. Another important reason is due to the background of the curve. It can be seen that transmission curve and reflection curve have very different background, which would influence considerably the position of the peak.

From FIG. 9(a) it is quite evident that the shift in reflectance mode is also more efficient during extraction than in the insertion mode, although both seem to exhibit an equal temporal efficiency.

An electrochromically tunable photonic device was assembled and characterized for its performance with the following configuration:

ITO/WO$_3$-inverse opal‖LiClO$_4$/PC‖ITO

Preliminary results indicating the possibility to fabricate an efficient EC-PC device were established.

Figure 9B:
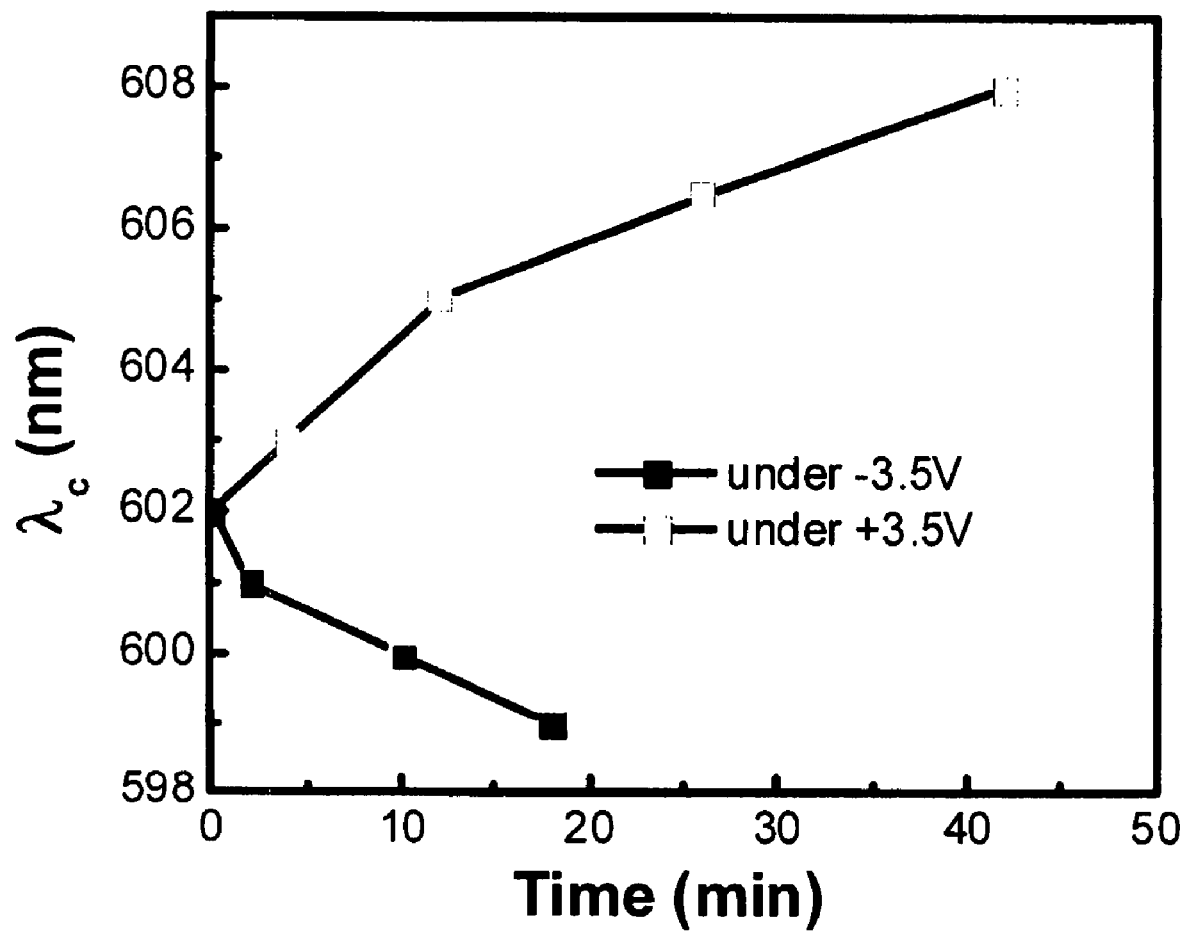
FIG. 9(b) shows peak wavelengths $\lambda_c$ of reflection band as a function of time.

FIG. 9(b) shows peak wavelengths $\lambda_c$ of reflection band as a function of time. A potential range from −3.5V to +3.5V is found to be suitable for operating the device with perceptible color changes and the ensuing photonic stop band tunability. Both transmission and reflection spectra show small but distinct shifts of the stop band under applied voltage and with time. Current measurement shows the build-up of lithium inside the inverse opal structure with time which will eventually cause the degeneration of the device. A predominantly polycrystalline WO$_3$ inverse opal is expected to provide a better control over the refractive index change through the density of free electrons injected and extracted. This should lead to an increased range of photonic tunability. The electrochromic effect (optical density and temporal efficiency) in these transition metal oxides (TMO) is a function of the mixed ion-electron conductivity of the opal structure. While the open and porous inverse-opal structure is conducive to increased lithium ion conductivity and availability in the WO3 film, there is a distinct need to improve the electronic conductivity. A predominantly polycrystalline film is expected to provide a better electronic conductivity and speed up the process of electrochromic coloration. An improved reversible and stable operation can only be established after a few dozens of initial insertion and extraction cycles to establish the channels of conductivity to the W sites and to establish an electrochemical equilibrium. Theoretical calculations relating to the tunability of these devices from the knowledge of the various optical constants in their active and passive states are also being carried out. Modelling of these devices is expected to help their future design.

In alternative embodiments, any suitable transparent conductor can be utilised instead of Indium Tin Oxide (ITO): any suitable electrochromic transition metal oxide, such as for example Molybdenum Oxide (MoO$_3$), Vanadium Pentoxide (V$_2$O$_5$). Titanium Oxide (TiO$_2$), Chromium Oxide (Cr$_2$O$_3$), or Cerium Oxide (CeO$_2$) can be utilised instead of Tungsten Oxide (WO$_3$); and any suitable electrolyte solution can be utilised instead of LiClO$_4$ in Polypropylene Carbonate (LiClO$_4$/PC) solution.

ALTERNATIVE EMBODIMENTS

The photonic crystals are periodically structured electromagnetic media (periodically varying dielectric or optical constants) possessing photonic band gaps (PBG) for certain frequencies. The PBG is mainly a function of the spatial periodicity parameters of the crystal and the dielectric/optical constants of the base material[1]. On the other hand, chromogenic materials[2] are those in which one can induce reversible optical property change through various external stimuli such as heat (thermochromics), light (photochromics), electric field (electrochromics) and gas exposure (gasochromics). Transition metal oxides (TMO) such as Tungsten trioxide (WO$_3$), Molybdenum trioxide (MoO$_3$), Vanadium pentoxide (V$_2$O$_5$), Vanadium dioxide (VO$_2$), chromium oxide (Cr$_2$O$_3$), titanium dioxide (TiO$_2$), to name some, exhibit very efficient chromogenic properties mostly due to their multiple oxidation states. Following the application of the external stimuli a reversible change in optical properties and optical constants occurs in these materials either through a reversible chemical or physical change when the pertinent conditions required for these changes are provided to the TMO based photonic crystals in device form. Unlike the on-off state switching found in liquid crystal based photonic crystals, a wavelength selective continuous or a punctual PBG tuning can be achieved through a these external stimuli in these TMO based photonic crystals.

An example of the reversible chemical change is the electrochromic effect[3] through the formation of tungsten bronze ($M_xWO_3$) with the application of an electric field to bring about the double injection of metal ions ($M^+$) and electrons in Tungsten trioxide ($WO_3$) as per the following reaction:

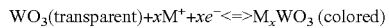

where M+ represents a proton ($H^1$) or a metal ion such as $Li^+$, $Ag^+$, $Na^+$ etc. The insertion species (ions and electrons) can be generally provided from an external source in a device form. A distinct and continuous change in the optical properties and optical constants[4] can be effected in normal $WO_3$ thin films at various frequencies (from ultraviolet to infrared) with the reversible formation of a new species. The nature of change in optical properties and optical constants depends strongly on the nature of the films. In amorphous films the change in optical properties occurs solely from the absorption modulation accepted to be resulting from the polaron absorption founded in localized electrons. In polycrystalline films the optical change is expected to result from the free electron effects as per the classical Drude model Polycrystalline film based photonic crystals are preferred in order to minimize the attenuation effect on the modified signal. Through our earlier work carried out on Tungsten trioxide ($WO_3$)[5] based inverse opal photonic crystals, we have amply demonstrated the PBG tunability under lithium atom intercalation and the ensuing electrochromic change similar to the reaction cited above. A continuous tunability of two Bragg diffraction peaks in the hexagonal macroporous structure could be achieved. Although, the electrochromic reversibility could not be demonstrated due to the sample configuration, our earlier work serves as a distinct tool to verify the potential for continuous tunability of PBG. Similarly, this earlier work also serves as a distinct tool for other types of chromogenic tunability of PBG in $WO_3$ and other TMO based photonic crystals if proper external conditions or stimuli can be provided in suitable device form from the ensuing physical or chemical change as discussed below.

An example of the reversible optical property change through reversible physical change is what occurs in materials such as vanadium dioxide ($VO_2$) where a sharp metal-insulator transition (MIT) takes place at 68° C. accompanied by an unambiguous change between monoclinic to tetragonal structures[6,7]. The necessary conditions for this switching can be provided, for example, by an electric heater and/or by photothermal effect using an external and pertinent light source. A continuous or abrupt change in optical constants can be induced in the stoichiometric $VO_2$ films[8]. The change in optical constants in $VO_2$ is, generally, expected to occur effectively in the near infrared region. The nature of the MIT (transition temperature, abruptness, recovery) is found to depend on a wide variety of parameters such as film thickness [9], nature of substrate[10], doping[11], structure[12]. Hence, it is possible to prepare the doped or undoped $VO_2$ thin films by various well known sol-gel methods similar to the one that is being used in our laboratory[13].

An example of the photochromism or more appropriately termed photochemichromism is the molybdenum oxide ($MoO_3$). Here the reversible change in optical properties and optical constants takes place through the light irradiation and the ensuing chemical reaction[14]. The photochromic mechanism for $MoO_3$ can be explained in a way similar to that of electrochromism with the difference that in the former the inserted positive ions come from within the structure of the $MoO_3$ films[14]. Electrons and holes are photogenerated in these films under appropriate conditions. The electrons, thus generated, then react with the adsorbed $H_2O$ molecules forming protons and liberating oxygen. These protons then form hydrogen bronze ($H_xMoO_3$) in the mixed valence $MoO_3$, similar to the formation of Tungsten bronze seen in electrochromism.

Hence, in general, the transition metal oxide (TMO) thin films are capable of exhibiting reversible chromogenic optical property change under various external stimuli. The ensuing optical constants change, abrupt or continuous, emanating from the physical or chemical changes can be successfully used for various optical and photonic applications. If one can successfully fabricate photonic crystals or their inverse opals based on these TMOs the PBG can be successfully tuned as per need through external stimuli. The two basic needs to be met for achieving this are: 1) fabrication of polycrystalline crystal templates on various substrates and 2) an appropriate sol-gel or liquid based methodology to infiltrate the templates and achieve the pertinent TMO based inverse opal.

The present disclosure relates to the fabrication of complete chromogenically tunable photonic crystal device to achieve the required conditions in the form of external stimuli. The TMOs considered for this work are doped or undoped $WO_3$, $MoO_3$, $V_2O_5$, $VO_2$, $TiO_2$, $Cr_2O_3$, $CeO_2$. The chromogenic mechanism and methodology of device fabrication, as an example, is shown in the case of Tungsten Trioxide ($WO_3$) based inverse opals and can be generalized to all other TMOs showing reversible optical and electrical property change in which the appropriate conditions and device configuration can be provided for the chromogenic change to occur.

Figure 10:
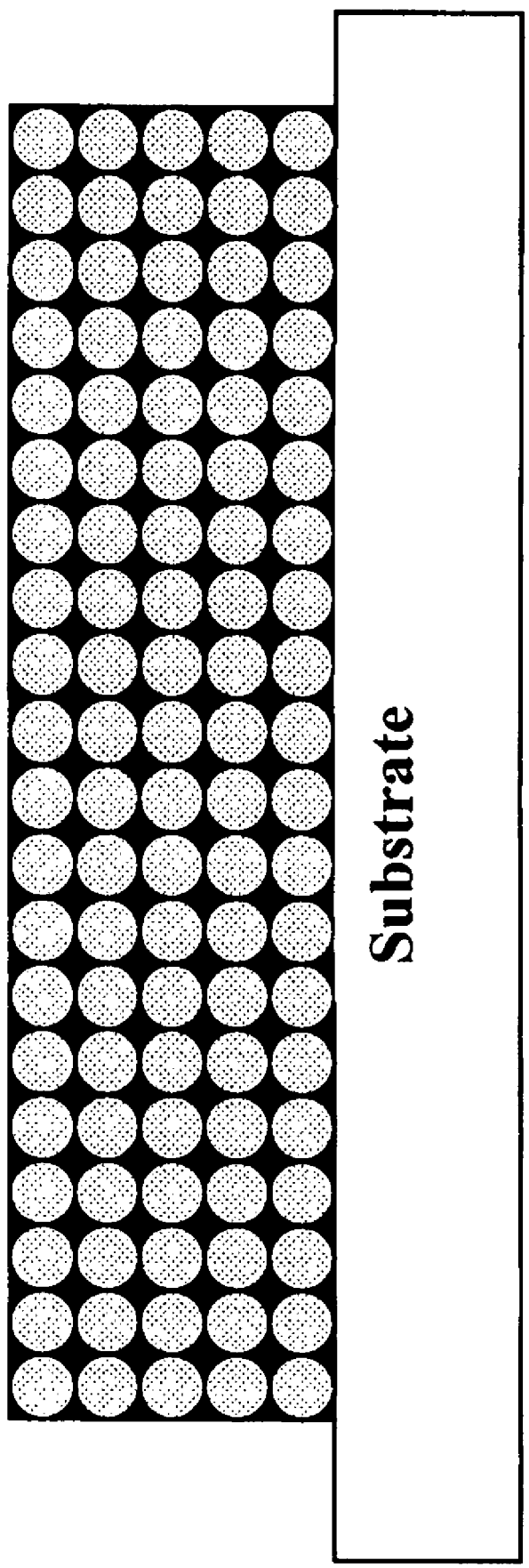
FIG. 10 illustrates a chromogenic-photonic crystal ("CG-PC") device, provided in accordance with one embodiment of the present invention.

FIG. 10 illustrates a chromogenic-photonic crystal ("CG-PC") device, provided in accordance with one embodiment of the present invention. A TMO based inverse opal is provided on a substrate, which can be conducting or non-conducting, opaque or transparent.

Figure 11:
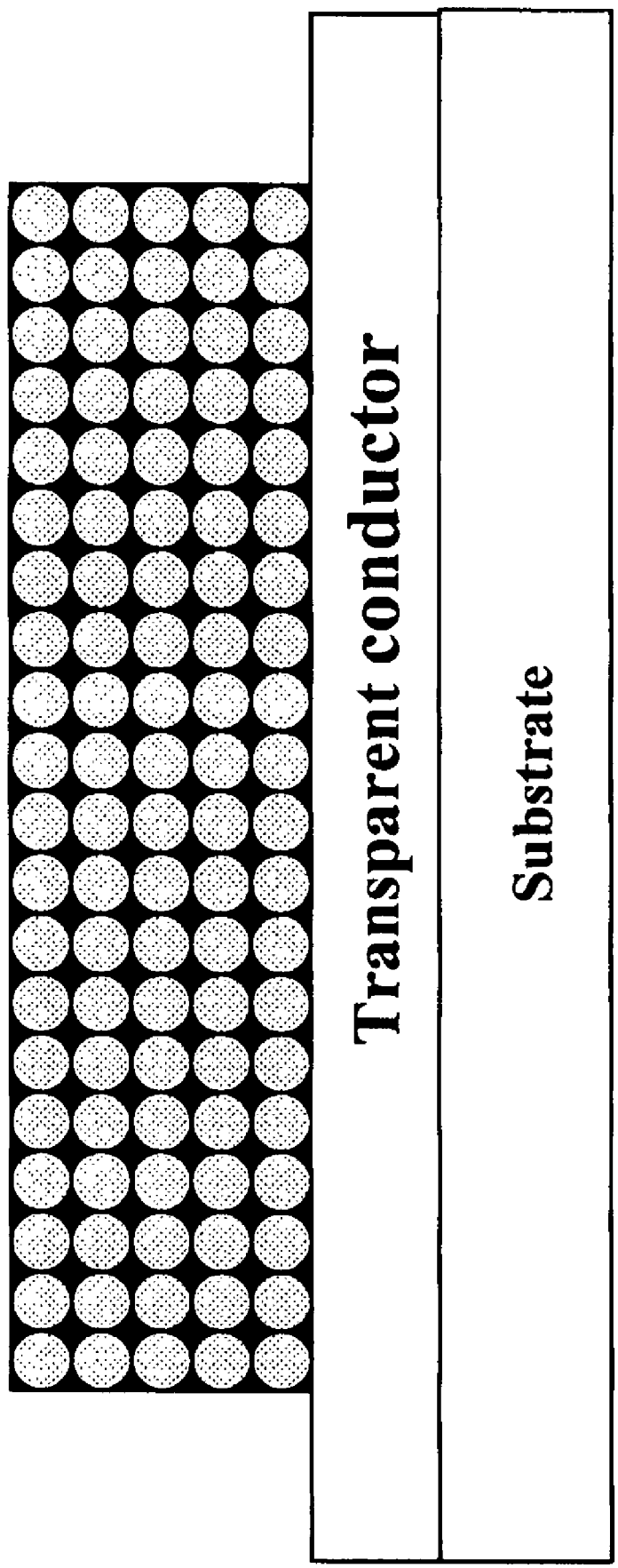
FIG. 11 illustrates a chromogenic-photonic crystal ("CG-PC") device, provided in accordance with one embodiment of the present invention.

FIG. 11 illustrates a chromogenic-photonic crystal ("CG-PC") device, provided in accordance with one embodiment of the present invention. A TMO based inverse opal is provided on a substrate, which can be conducting or non-conducting, opaque or transparent. The substrate is coated with a conductor, which in the case shown is a transparent conductor. In an alternate embodiment, the conductor coating the conductor need not be transparent.

Figure 12:
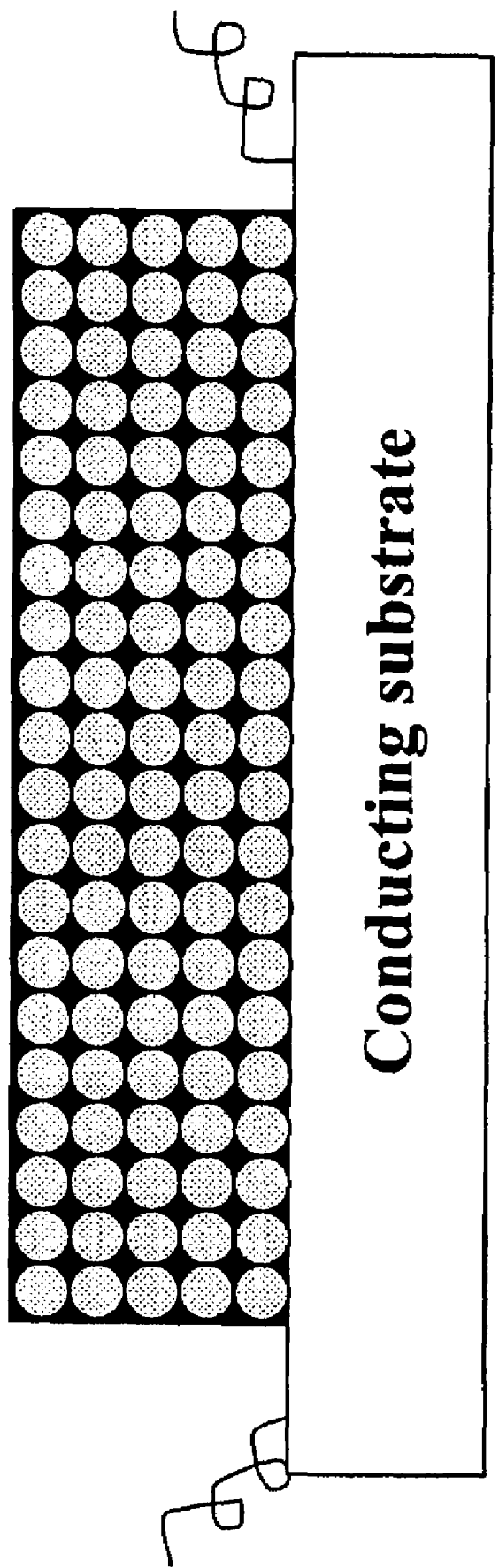
FIG. 12 illustrates a thermochromic-photonic crystal ("TC-PC") device, provided in accordance with one embodiment of the present invention.

FIG. 12 illustrates a thermochromic-photonic crystal ("TC-PC") device, provided in accordance with one embodiment of the present invention. A thermochromically tunable photonic inverse opal device where the TMO based inverse opal (as in FIG. 10) and provided with electrical contacts for heating the conducting transparent or opaque substrate. Reversibility can be achieved, for example, by letting the TC-PC device cool, or by forcing a cooling of the TC-PC device.

Figure 13:
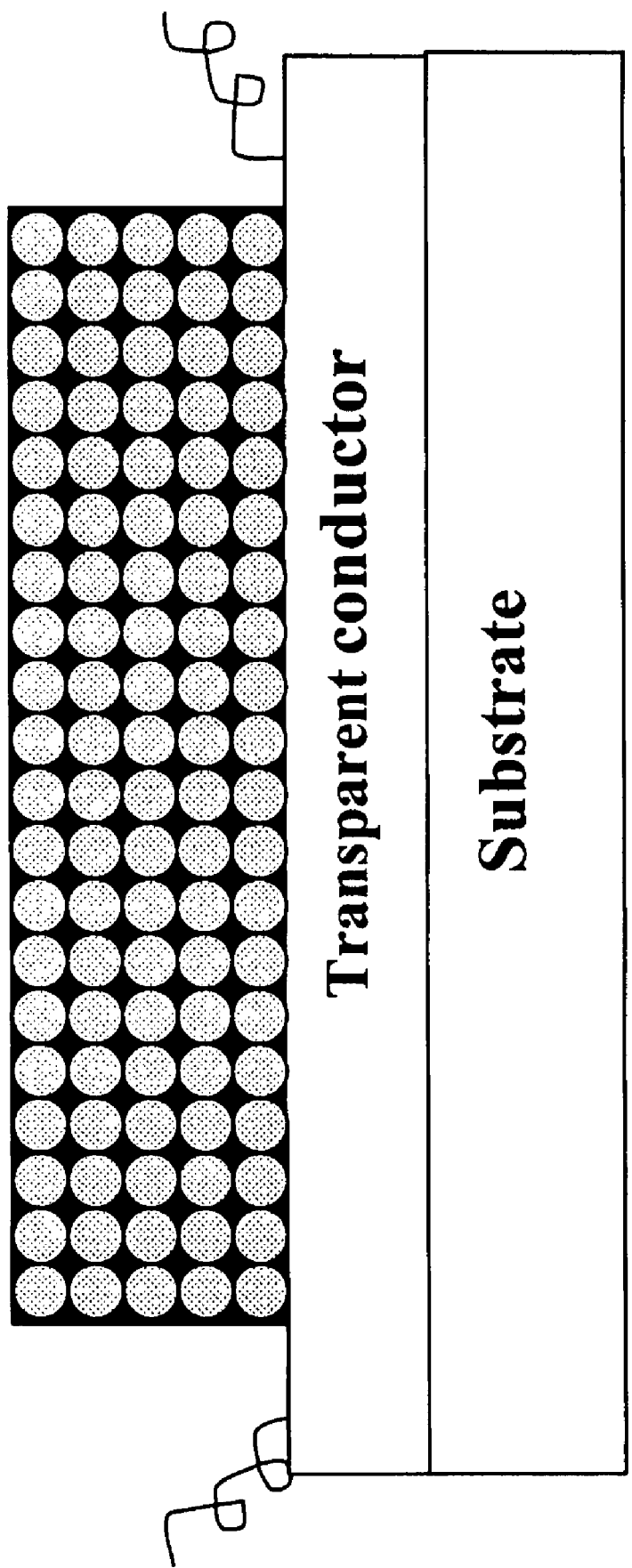
FIG. 13 illustrates a thermochromic-photonic crystal ("TC-PC") device, provided in accordance with one embodiment of the present invention.

FIG. 13 illustrates a thermochromic-photonic crystal ("TC-PC") device, provided in accordance with one embodiment of the present invention. A thermochromically tunable photonic inverse opal device where the TMO based inverse opal (as in FIG. 11) and provided with electrical contacts for heating the conducting transparent coating on the substrate. In an alternate embodiment, the conducting coating is opaque. Reversibility can be achieved by letting the TC-PC device cool, or by forcing a cooling of the TC-PC device.

Figure 14:
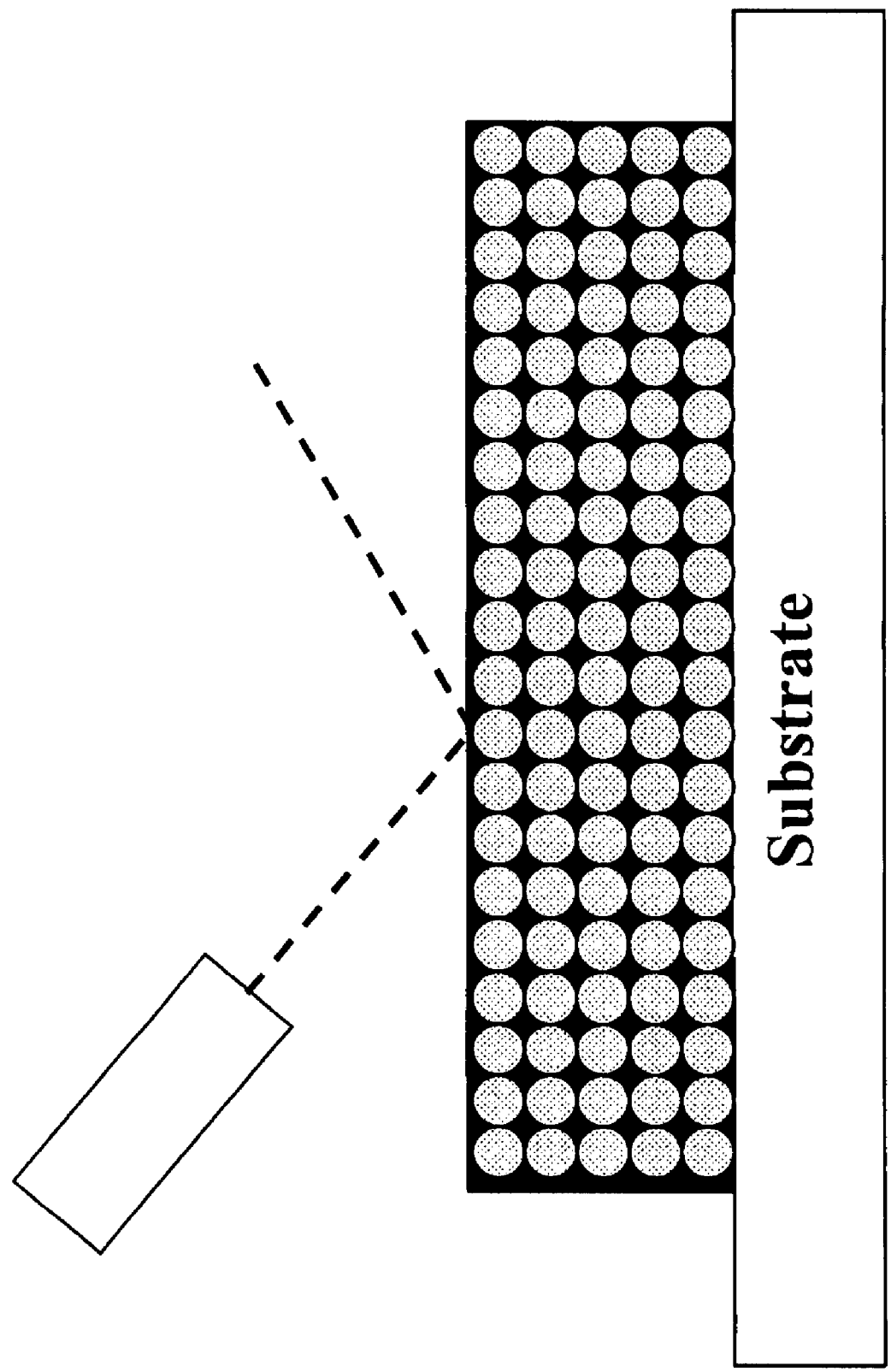
FIG. 14 illustrates a photochromic-photonic crystal ("PC-PC") device, provided in accordance with one embodiment of the present invention.

FIG. 14 illustrates a photochromic-photonic crystal ("PC-PC") device, provided in accordance with one embodiment of the present invention. A photochromically tunable photonic inverse opal device where the TMO based inverse opal is applied to an appropriate substrate and provided with an external pertinent light source such as a laser. Reversibility can be achieved, for example, by turning off the pertinent light source and letting the PC-PC device decay from any excited state caused by the pertinent light source.

Figure 15:
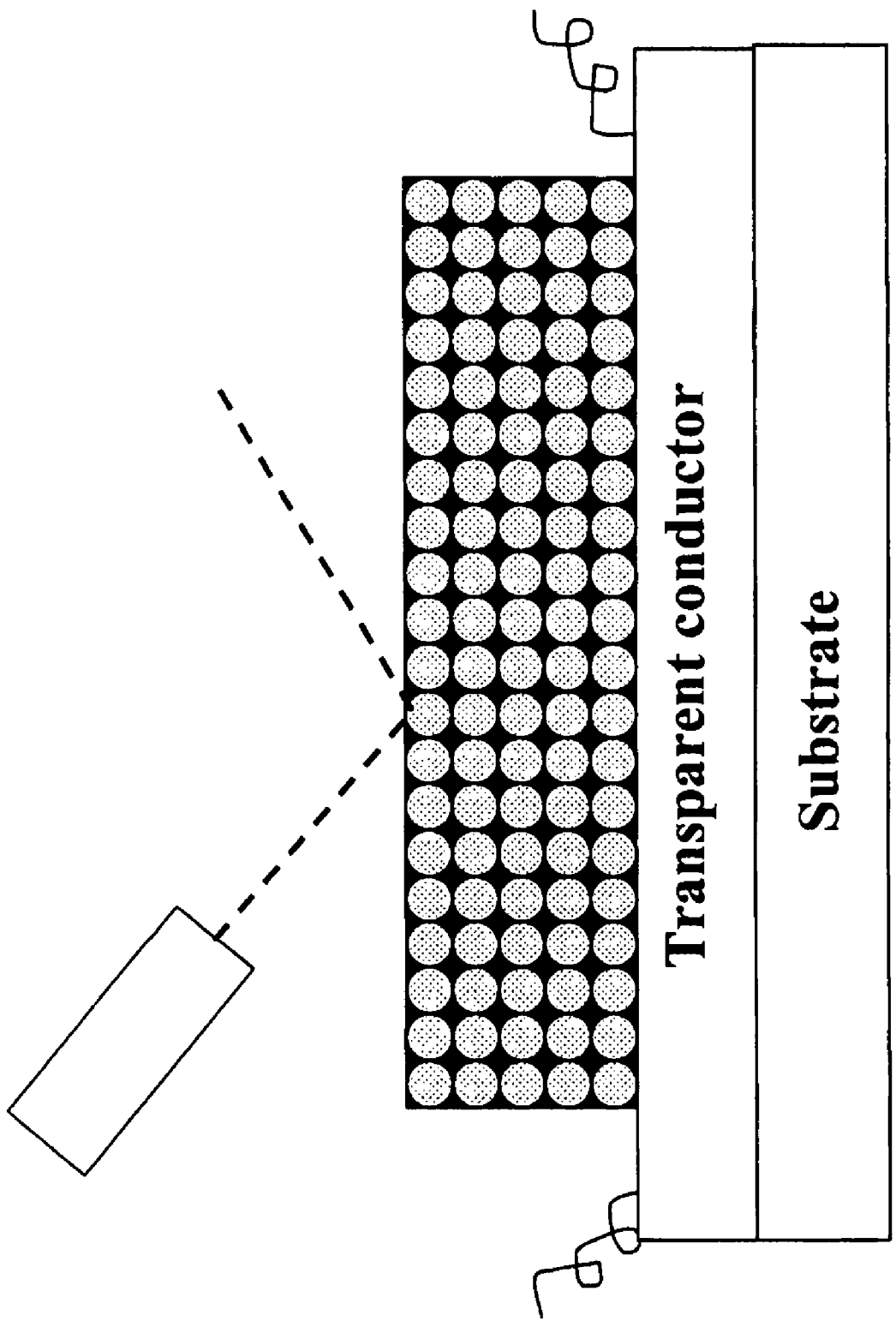
FIG. 15 illustrates a chromogenic-photonic crystal ("CG-PC") device, provided in accordance with one embodiment of the present invention.

FIG. 15 illustrates a chromogenic-photonic crystal ("CG-PC") device, provided in accordance with one embodiment of the present invention. A thermochromically tunable photonic inverse opal device where the TMO based inverse opal (as in FIGS. 11 and 13) additional photothermal heating with an external pertinent light source such as a laser. Reversibility can be achieved, for example, by turning off the pertinent light source and letting the PC-PC device decay from any excited state caused by the pertinent light source, by letting the TC-PC device cool, or by forcing a cooling of the TC-PC device.

Although not expressly shown in the drawings, general embodiments of chromogenic devices provided in accordance with the present invention include combinations and subcombinations of electrochromic, photochromic, thermochromic devices featuring TMO based inverse opals having tunable photonic band gaps (PBG) for certain frequencies.

The above-described embodiments of the present invention are intended to be examples only. Those of skill in the art may effect alterations, modifications and variations to the particular embodiments without departing from the scope of the invention, which is set forth in the claims.

REFERENCES

The following documents are incorporated herein by reference in their entirety and are referred to herein by their bracketed numbers:

[1] J. D. Joannopoulos, R. D. Meade and J. N. Wien, *Photonic Crystals; Molding the Flow of Light*, Princeton University Press, Princeton, 1995);
[2] C. M. Lampert and C. G. Granqvist, *Large Area Chromogenics: Materials and Devices for Transmittance Control*, Vol. IS4 (SPIE Institute Series, Bellingham, 1990);
[3] C. G. Granqvist, *Handbook of Inorganic Electrochromic Materials*, 2$^{nd}$ Edition (Elsevier, 2002);
[4] G. Bader, P. V. Ashrit and Vo-Van Truong, *Transmission and Reflection Ellipsometry Studies of Electrochromic Materials and Devices*, Proceedings of the Society of Photo-Optical Instrumentation Engineers (SPIE), 2531, 70 (1995);
[5] Sulan-Kuai, Georges Bader and P. V. Ashrit, *Applied Physics Lett.*, 86, 221110 (2005).
[6] J. B. Goodenough, *J. Solid State Chem.*, 3, 490 (1971);
[7] S. Lu. L. Hou and F. Gan, *Advanced Materials*, 9, 244 (1997);
[8] Hiroshi Kakiuchida et al., *Jap. J. Appl. Phys.*, 46, L113 (2007);
[9] Gang Xu, Ping Jin, Masato Tazawa, Kazuki Yoshimura, *Appl. Surface Science*, 244, 449 (2005);
[10] Y. Muraoka and Z. Hiroi, *Appl. Phys. Lett.*, 80, 583 (2002);
[11] M. Soltani et al., *J. Vac. Sci. & Technol*, A22(3), 859 (2004);
[12] Christophe Petit et al., *J. Phys.: Condens. Mater.*, 11, 3259 (1999);
[13] Yuan et al., *Appl. Surf. Sci.*, 191, 176 (2002);
[14] Tao He et al., *Langmuir*, 17, 8024 (2001);
[15] S. John, *Photonic Band Gaps and Localization*, Vol. 308, NATO Advanced Study Institute Series B: Physics, E d. C. M. Soukoulis (Plenum, New York, 1993);
[16] Wounjhang Park and Jeong_Bong Lee, "Mechanically tunable photonic crystal structure", *Appl. Phys. Lett.*, 85, 4845-7 (2004);
[17] Sungwon Kim and venkataraman Gopalan, "Strain-tunable photonic band gap crystals", *Appl. Phys. Lett.*, 78, 3015-7 (2001);
[18] P. Sheng, W. J. Wien, N. Wang, H. R. Ma, Z. F. Lin, W. Y. Zhang, X. Y. Lei, Z. L. Wang, D. G. Zheng, W. Y. Tam and C. T. Chan, *Pure Appl Chem.*, 72, 309 (200);
[19] K. Busch and S. John, *Phys. Rev. lett.*, 83, 967 (1999);
[20] Sergri F. Mangaleev, Matthias Schillinger, Daniel Hermann and Kurt Busch, "Tunable Photonic Crystal Circuits: Concepts and designs based on single-pore infiltration", *Optics Letters*, 29, 2858-60 (2004);
[21] P. Halevi and F. Ramos-Mendieta, "Tunable Photonic Crystals with Semiconducting Constituents", *Phys. Rev. Lett.*, 85, 1875-8 (2000);
[22] Alex Figotin, Yuri A. Godin and Ilia Vitebsky, "Two-dimensional Tunable Photonic Crystals", *Phys. Rev. B.*, 57, 2841-8 (1998);
[23] P. Jiang, J. F. Bertone, K. S. Hwang, and V. L. Colvin, *Chem. Mater.* 11, 2132 (1999);
[24] J. P. Cronin, D. J. Tarico, A. Agrawal, and L. Zhang, U.S. Pat. No. 5,277,986 (11 Jan. 1994);
[25] S. L. Kuai, V. V. Truong, A. Haché and X. F. Hu, *J. Appl. Phys.*, 96, 5982 (2004);
[26] P. V. Ashrit, *Thin Solid Films*, 385, 81-88 (2001);
[27] P. V. Ashrit, G. Bader and V. V. Truong, *Thin Solid Films*, 320, 324 (1998); and
[28] A. A. Chabanov, Y. Jun, and D. J. Norris, Appl. Phys. Lett. 84 (2004) 3573.

What is claimed is:

1. A method of fabrication of an electrochromically tunable photonic device, the method comprising the steps of:
   (a) providing a first transparent conductor coated substrate having a film side comprising the transparent conductor coating;
   (b) providing an electrochromic transition metal oxide inverse opal structure;
   (c) providing electrolyte solution as a source of metal ions;
   (d) providing a second transparent conductor coated substrate having a film side comprising the transparent conductor coating; and
   (e) sandwiching the electrochromic transition metal oxide inverse opal structure and the electrolyte solution between the film side of said first transparent conductor coated substrate and the film side of the second transparent conductor coated substrate.

2. The method as recited in claim 1, wherein the transparent conductor is Indium Tin Oxide (ITO).

3. The method as recited in claim 1, wherein the electrochromic transition metal oxide is Tungsten Oxide ($WO_3$).

4. The method as recited in claim 1, wherein the electrochromic transition metal oxide is Molybdenum Oxide ($MoO_3$).

5. The method as recited in claim 1, wherein the electrochromic transition metal oxide is Vanadium Pentoxide ($V_2O_5$).

6. The method as recited in claim 1, wherein the electrochromic transition metal oxide is Chromium Oxide ($Cr_2O_3$).

7. The method as recited in claim 1, wherein the electrochromic transition metal oxide is Titanium Oxide ($TiO_2$).

8. The method as recited in claim 1, wherein the electrochromic transition metal oxide is Cerium Oxide ($CeO_2$).

9. The method as recited in claim 1, wherein the electrolyte solution is a $LiClO_4$ in Polypropylene Carbonate ($LiClO_4$/PC) solution.

10. The method as recited in claim 1, wherein the step of providing electrochromic transition metal oxide inverse opal structure comprises the acts of:
   (a) providing a polystyrene colloidal crystal template on the film side of the first transparent conductor coated substrate;
   (b) providing an electrochromic transition metal oxide sol;
   (c) replacing the polystyrene colloidal crystal template with electrochromic transition metal oxide contained in the electrochromic transition metal oxide sol by using the dip-infiltrating sol-gel technique thereby providing the electrochromic transition metal oxide inverse opal structure on the first transparent conductor coated substrate.

11. The method as recited in claim 10, wherein the act of providing colloidal crystal template on the film side of the first transparent conductor coated substrate comprises the acts of:
   (a) cleaning the first transparent conductor coated substrate to provide a substrate;
   (b) placing the substrate vertically into a vial filled with aqueous solution of polystyrene monodisperse spheres;
   (c) maintaining conditions appropriate for the polystyrene colloidal crystal template to grow onto the film side of the substrate.

12. The method as recited in claim 11, wherein the polystyrene monodisperse spheres have a size which is between 200 nm and 400 nm.

13. The method as recited in claim 11, wherein the volume fraction of the aqueous solution is about 1 to 1.5 drop of 10% polystyrene spheres per 5 ml water.

14. The method as recited in claim 11, wherein temperature is maintained at about 60° C.

15. The method as recited in claim 11, wherein a period during which the conditions are maintained is about a week.

16. The method as recited in claim 11, wherein the polystyrene monodisperse spheres have a size which is above 600 nm.

17. The method as recited in claim 16, wherein a temperature gradient is applied across the vial by placing the vial in a sand bath on a hot plate.

18. The method as recited in claim 10, wherein the act of providing an electrochromic transition metal oxide sol comprises the acts of:
   (a) dissolving metallic electrochromic transition metal in Hydrogen peroxide and acetic acid to form a solution;
   (b) filtering the solution;
   (c) evaporating the solution to dryness resulting in an electrochromic transition metal peroxy acid powder;
   (d) reacting the electrochromic transition metal peroxy acid powder with ethanol to form the electrochromic transition metal oxide sol comprising a electrochromic transition metal peroxyester derivative dipping solution; and
   (e) removing any precipitate from the electrochromic transition metal oxide sol.

19. The method as recited in claim 10, wherein the act of replacing the polystyrene colloidal crystal template with electrochromic transition metal contained in the electrochromic transition metal oxide sol comprises the acts of:
   (a) immersing the polystyrene colloidal crystal template on the film side of the first transparent conductor coated substrate vertically in the electrochromic transition metal oxide sol so that the electrochromic transition metal oxide sol penetrates the voids in the template due to capillary forces thereby providing a sample;
   (b) removing the sample from the electrochromic transition metal oxide sol;
   (c) gelating the electrochromic transition metal oxide sol which penetrated the voids in the template of the sample;
   (d) drying the sample the sample thereby resulting in a polystyrene-gel composite;
   (e) optionally repeating acts a-d so as to incorporate more material into the template; and
   (f) sintering the resulting polystyrene-gel composite to remove the polystyrene template thereby leaving a fully porous electrochromic transition metal inverse opal structure.

20. The method as recited in claim 19, wherein the act of immersing is conducted for about 5 minutes.

21. The method as recited in claim 19, wherein the act of drying occurs at about 80° C. for about half an hour.

22. The method as recited in claim 19, wherein the act of sintering occurs at about 460° C. for about an hour.

23. The method as recited in claim 1, further comprising, prior to the sandwiching step, a step of inserting lithium atoms in the inverse opal structure to facilitate the fabrication and to optimize the lithium content thereby improving the coloration of the device.

24. The method as recited in claim 23, wherein the inserting lithium atoms step comprises a lithination act carried out by one of a dry in-situ method and a wet method.

25. The method as recited in claim 1, wherein the sandwiching step comprises the acts of:
   (a) providing a plastic spacer between the first and second transparent conductor coated substrate so as to create a channel to receive the electrolyte solution;
   (b) applying a small pressure onto the sandwiched structure while heating to melt the spacer and fuse the structure together while leaving a small opening for the channel in the spacer;
   (c) sucking the electrolyte solution into the sandwiched structure under vacuum through the small opening left in the spacer; and
   (d) blocking the small opening in the spacer to prevent leakage of the electrolyte solution.

* * * * *